United States Patent
Bowles et al.

(10) Patent No.: US 11,080,662 B2
(45) Date of Patent: Aug. 3, 2021

(54) SECONDARY MARKET AND VENDING SYSTEM FOR DEVICES

(71) Applicant: ecoATM, Inc., San Diego, CA (US)

(72) Inventors: Mark Vincent Bowles, San Diego, CA (US); Michael Librizzi, San Diego, CA (US)

(73) Assignee: ecoATM, LLC, San Diego, CA (US)

( * ) Notice: Subject to any disclaimer, the term of this patent is extended or adjusted under 35 U.S.C. 154(b) by 0 days.

(21) Appl. No.: 15/672,157

(22) Filed: Aug. 8, 2017

(65) Prior Publication Data

US 2017/0372273 A1     Dec. 28, 2017

Related U.S. Application Data

(63) Continuation of application No. 13/913,408, filed on Jun. 8, 2013, now Pat. No. 10,032,140, which is a continuation of application No. 13/487,299, filed on Jun. 4, 2012, now Pat. No. 8,463,646, which is a continuation of application No. 12/573,089, filed on Oct. 2, 2009, now Pat. No. 8,195,511.

(60) Provisional application No. 61/183,510, filed on Jun. 2, 2009, provisional application No. 61/102,304, filed on Oct. 2, 2008.

(51) Int. Cl.
| | |
|---|---|
| *G06Q 10/00* | (2012.01) |
| *G06Q 30/02* | (2012.01) |
| *G06Q 30/06* | (2012.01) |
| *G07F 7/06* | (2006.01) |

(52) U.S. Cl.
CPC ......... *G06Q 10/30* (2013.01); *G06Q 30/0237* (2013.01); *G06Q 30/0278* (2013.01); *G06Q 30/0601* (2013.01); *G07F 7/06* (2013.01); *Y02W 30/82* (2015.05)

(58) Field of Classification Search
CPC ........................ G06Q 10/30; G06Q 30/0278
See application file for complete search history.

(56) References Cited

U.S. PATENT DOCUMENTS

| | | | |
|---|---|---|---|
| 3,808,439 | A | 4/1974 | Renius |
| 4,248,334 | A | 2/1981 | Hanley et al. |
| 4,519,522 | A | 5/1985 | McElwee |
| 4,593,820 | A | 6/1986 | Antonie et al. |
| 4,715,709 | A | 12/1987 | Sekine et al. |

(Continued)

FOREIGN PATENT DOCUMENTS

| | | |
|---|---|---|
| CN | 1365479 | 8/2002 |
| CN | 1574437 | 2/2005 |

(Continued)

OTHER PUBLICATIONS

2006 Florida Statutes Title XXXIII, Chapter 538, Sections 538.03 and 538.04, 7 pages.

(Continued)

*Primary Examiner* — Julie M Shanker
(74) *Attorney, Agent, or Firm* — Perkins Coie LLP

(57) ABSTRACT

The system enables one to securely recycle an electronic device in a publicly accessible location. In particular, the embodiment described may be used by a mobile phone owner to submit his/her mobile phone for recycling via an electronic kiosk and receive compensation in some form. The compensation might be dispersed via cash, voucher, credit or debit card, or other magnetic or electronic transaction methods.

20 Claims, 12 Drawing Sheets

(56) References Cited

U.S. PATENT DOCUMENTS

| | | |
|---|---|---|
| 4,821,118 A | 4/1989 | Lafreniere |
| 4,845,636 A | 7/1989 | Walker |
| 4,870,357 A | 9/1989 | Young et al. |
| 4,878,736 A | 11/1989 | Hekker et al. |
| 4,927,051 A | 5/1990 | Falk et al. |
| 4,951,308 A | 8/1990 | Bishop et al. |
| 5,027,074 A | 6/1991 | Haferstat |
| 5,077,462 A | 12/1991 | Newell et al. |
| 5,091,773 A | 2/1992 | Fouche et al. |
| 5,105,149 A | 4/1992 | Tokura |
| 5,216,502 A | 6/1993 | Katz |
| 5,280,170 A | 1/1994 | Baldwin |
| 5,319,459 A | 6/1994 | Mochizuki et al. |
| 5,339,096 A | 8/1994 | Beaufort et al. |
| 5,419,438 A | 5/1995 | Squyres et al. |
| 5,436,554 A | 7/1995 | Decker |
| 5,570,920 A | 11/1996 | Crisman et al. |
| 5,572,444 A | 11/1996 | Lentz et al. |
| 5,610,710 A | 3/1997 | Canfield et al. |
| 5,717,780 A | 2/1998 | Mitsumune et al. |
| 5,747,784 A | 5/1998 | Walter et al. |
| 5,748,084 A | 5/1998 | Isikoff |
| 5,775,806 A | 7/1998 | Allred |
| 5,839,058 A | 11/1998 | Phillips et al. |
| 5,920,338 A | 7/1999 | Katz |
| 5,949,901 A | 9/1999 | Nichani et al. |
| 5,965,858 A | 10/1999 | Suzuki et al. |
| 5,966,654 A | 10/1999 | Croughwell et al. |
| 5,987,159 A | 11/1999 | Nichani |
| 5,988,431 A | 11/1999 | Roe |
| 6,029,851 A | 2/2000 | Jenkins et al. |
| 6,041,229 A | 3/2000 | Turner |
| 6,055,512 A | 4/2000 | Dean et al. |
| 6,100,986 A | 8/2000 | Rydningen |
| 6,181,805 B1 | 1/2001 | Koike et al. |
| 6,228,008 B1 | 5/2001 | Pollington et al. |
| 6,259,827 B1 | 7/2001 | Nichani |
| 6,264,104 B1 | 7/2001 | Jenkins et al. |
| 6,330,354 B1 | 12/2001 | Companion et al. |
| 6,330,958 B1 | 12/2001 | Ruskin et al. |
| 6,393,095 B1 | 5/2002 | Robinson |
| 6,462,644 B1 | 10/2002 | Howell et al. |
| 6,529,837 B1 | 3/2003 | Kang |
| 6,535,637 B1 | 3/2003 | Wootton et al. |
| 6,573,886 B1 | 6/2003 | Lehtinen et al. |
| 6,587,581 B1 | 7/2003 | Matsuyama et al. |
| 6,595,684 B1 | 7/2003 | Casagrande et al. |
| 6,597,552 B1 | 7/2003 | Griepentrog et al. |
| 6,633,377 B1 | 10/2003 | Weiss et al. |
| 6,667,800 B1 | 12/2003 | Larsson et al. |
| 6,748,296 B2 | 6/2004 | Banerjee et al. |
| 6,754,637 B1 | 6/2004 | Stenz |
| 6,758,370 B2 | 7/2004 | Cooke et al. |
| 6,798,528 B1 | 9/2004 | Hartman |
| 6,822,422 B2 | 11/2004 | Sagawa |
| 6,842,596 B2 | 1/2005 | Morii et al. |
| 6,854,656 B2 | 2/2005 | Matsumori |
| 6,947,941 B1 | 9/2005 | Koon |
| 7,069,236 B1 | 6/2006 | Tsunenari |
| 7,076,449 B2 | 7/2006 | Tsunenari et al. |
| 7,178,720 B1 | 2/2007 | Strubbe et al. |
| 7,234,609 B2 | 6/2007 | DeLazzer et al. |
| 7,251,458 B2 | 7/2007 | O'Connell |
| 7,268,345 B2 | 9/2007 | Schultz |
| 7,334,729 B2 | 2/2008 | Brewington |
| 7,455,226 B1 | 11/2008 | Hammond et al. |
| 7,520,666 B2 | 4/2009 | Pevzner et al. |
| 7,529,687 B1 | 5/2009 | Phan |
| 7,567,344 B2 | 7/2009 | LeBlanc et al. |
| 7,646,193 B2 | 1/2010 | Suzuki et al. |
| 7,649,450 B2 | 1/2010 | Campion et al. |
| 7,702,108 B2 | 4/2010 | Amon et al. |
| 7,735,125 B1 | 6/2010 | Alvarez et al. |
| 7,761,331 B2 | 7/2010 | Low et al. |
| 7,783,379 B2 | 8/2010 | Beane et al. |
| 7,848,833 B2 | 12/2010 | Li et al. |
| 7,881,965 B2 | 2/2011 | Bowles et al. |
| 8,010,402 B1 | 8/2011 | Sharma et al. |
| 8,019,588 B1 | 9/2011 | Wohlberg et al. |
| 8,025,229 B2 | 9/2011 | Hammond et al. |
| 8,031,930 B2 | 10/2011 | Wang et al. |
| 8,107,243 B2 | 1/2012 | Guccione et al. |
| 8,112,325 B2 | 2/2012 | Foy et al. |
| 8,195,511 B2 | 6/2012 | Bowles et al. |
| 8,200,533 B2 | 6/2012 | Librizzi et al. |
| 8,200,736 B2 | 6/2012 | Shi et al. |
| 8,215,546 B2 | 7/2012 | Lin et al. |
| 8,239,262 B2 | 8/2012 | Bowles et al. |
| 8,254,883 B2 | 8/2012 | Uchida |
| 8,266,008 B1 | 9/2012 | Siegel et al. |
| 8,423,404 B2 | 4/2013 | Bowles et al. |
| 8,429,021 B2 | 4/2013 | Kraft et al. |
| 8,463,646 B2 | 6/2013 | Bowles et al. |
| 8,543,358 B2 | 9/2013 | Trabona |
| 8,566,183 B1 | 10/2013 | Bonar et al. |
| 8,606,633 B2 | 12/2013 | Tarbert et al. |
| 8,718,717 B2 | 5/2014 | Vaknin et al. |
| 8,743,215 B1 | 6/2014 | Lee |
| 8,806,280 B2 | 8/2014 | Stephenson et al. |
| 8,823,794 B2 | 9/2014 | Waring et al. |
| 8,824,136 B1 | 9/2014 | Interian et al. |
| 9,010,627 B1 | 4/2015 | Prasad et al. |
| 9,043,026 B2 | 5/2015 | Lien et al. |
| 9,189,911 B2 | 11/2015 | Kavli et al. |
| 9,195,979 B2 | 11/2015 | Geller |
| 9,317,989 B2 | 4/2016 | Grow et al. |
| 9,818,160 B2 | 11/2017 | Bowles et al. |
| 9,881,284 B2 | 1/2018 | Bowles |
| 9,904,911 B2 | 2/2018 | Bowles et al. |
| 10,157,427 B2 | 12/2018 | Bowles et al. |
| 10,401,411 B2 | 9/2019 | Snook et al. |
| 10,825,082 B2 | 11/2020 | Librizzi et al. |
| 10,853,873 B2 | 12/2020 | Bowles et al. |
| 2001/0039531 A1 | 11/2001 | Aoki |
| 2002/0014577 A1 | 2/2002 | Ulrich et al. |
| 2002/0035515 A1 | 3/2002 | Moreno |
| 2002/0067184 A1 | 6/2002 | Smith et al. |
| 2002/0087413 A1 | 7/2002 | Mahaffy et al. |
| 2002/0112177 A1* | 8/2002 | Voltmer .................. G06F 21/32 726/26 |
| 2002/0129170 A1 | 9/2002 | Moore et al. |
| 2002/0157033 A1 | 10/2002 | Cox |
| 2002/0162966 A1 | 11/2002 | Yoder |
| 2002/0186878 A1 | 12/2002 | Hoon et al. |
| 2003/0006277 A1 | 1/2003 | Maskatiya et al. |
| 2003/0018897 A1 | 1/2003 | Bellis, Jr. et al. |
| 2003/0025476 A1 | 2/2003 | Trela |
| 2003/0036866 A1 | 2/2003 | Nair et al. |
| 2003/0061150 A1 | 3/2003 | Kocher |
| 2003/0100707 A1 | 5/2003 | Hwang et al. |
| 2003/0146898 A1 | 8/2003 | Kawasaki et al. |
| 2003/0170529 A1 | 9/2003 | Sagawa |
| 2003/0191675 A1* | 10/2003 | Murashita ............... G06Q 10/10 705/50 |
| 2003/0197782 A1 | 10/2003 | Ashe |
| 2003/0204289 A1* | 10/2003 | Banerjee ............... G06Q 50/188 700/241 |
| 2004/0012825 A1 | 1/2004 | Tesavis |
| 2004/0088231 A1 | 5/2004 | Davis |
| 2004/0114153 A1 | 6/2004 | Andersen et al. |
| 2004/0141320 A1 | 7/2004 | Bock et al. |
| 2004/0150815 A1 | 8/2004 | Sones et al. |
| 2004/0156557 A1 | 8/2004 | Van Der Weij |
| 2004/0156667 A1 | 8/2004 | Berger et al. |
| 2004/0186744 A1 | 9/2004 | Lux |
| 2004/0189812 A1 | 9/2004 | Gustavsson et al. |
| 2004/0200902 A1 | 10/2004 | Ishioroshi |
| 2004/0205015 A1 | 10/2004 | DeLaCruz |
| 2004/0235513 A1 | 11/2004 | O'Connell |
| 2004/0242216 A1 | 12/2004 | Boutsikakis |
| 2004/0262521 A1 | 12/2004 | Devitt et al. |
| 2005/0027622 A1 | 2/2005 | Walker et al. |
| 2005/0043897 A1 | 2/2005 | Meyer |
| 2005/0109841 A1 | 5/2005 | Ryan et al. |

(56) References Cited

U.S. PATENT DOCUMENTS

| | | |
|---|---|---|
| 2005/0128551 A1 | 6/2005 | Yang |
| 2005/0137942 A1 | 6/2005 | LaFluer |
| 2005/0139661 A1 | 6/2005 | Eglen et al. |
| 2005/0143149 A1 | 6/2005 | Becker et al. |
| 2005/0167620 A1 | 8/2005 | Cho et al. |
| 2005/0187657 A1 | 8/2005 | Hashimoto et al. |
| 2005/0216120 A1 | 9/2005 | Rosenberg et al. |
| 2005/0222690 A1 | 10/2005 | Wang et al. |
| 2005/0231595 A1 | 10/2005 | Wang et al. |
| 2005/0240958 A1 | 10/2005 | Nguyen et al. |
| 2006/0038114 A9 | 2/2006 | Cofer et al. |
| 2006/0047573 A1 | 3/2006 | Mitchell et al. |
| 2006/0074756 A1 | 4/2006 | Boykin |
| 2006/0085158 A1 | 4/2006 | Cakiner |
| 2006/0167580 A1 | 7/2006 | Whittier |
| 2006/0184379 A1 | 8/2006 | Tan et al. |
| 2006/0195384 A1 | 8/2006 | Bauer et al. |
| 2006/0219776 A1 | 10/2006 | Finn |
| 2006/0229108 A1 | 10/2006 | Cehelnik |
| 2006/0235747 A1 | 10/2006 | Hammond et al. |
| 2006/0217152 A1 | 11/2006 | Fok et al. |
| 2006/0258008 A1 | 11/2006 | Holler et al. |
| 2006/0261931 A1 | 11/2006 | Cheng et al. |
| 2006/0271431 A1 | 11/2006 | Wehr et al. |
| 2006/0279307 A1 | 12/2006 | Wang et al. |
| 2006/0280356 A1 | 12/2006 | Yamagishi |
| 2007/0012665 A1 | 1/2007 | Nelson |
| 2007/0013124 A1 | 1/2007 | Graef et al. |
| 2007/0032098 A1 | 2/2007 | Bowels et al. |
| 2007/0057815 A1 | 3/2007 | Foy et al. |
| 2007/0129906 A1 | 6/2007 | Stoecker et al. |
| 2007/0133844 A1 | 6/2007 | Waehner et al. |
| 2007/0140310 A1 | 6/2007 | Rolton et al. |
| 2007/0150403 A1 | 6/2007 | Mock et al. |
| 2007/0205751 A1 | 9/2007 | Suzuki et al. |
| 2007/0258085 A1 | 11/2007 | Robbins |
| 2007/0263099 A1 | 11/2007 | Motta et al. |
| 2007/0269099 A1 | 11/2007 | Nishino et al. |
| 2007/0276911 A1 | 11/2007 | Bhumkar et al. |
| 2007/0281734 A1 | 12/2007 | Mizrachi |
| 2007/0282999 A1* | 12/2007 | Tu .................. G06F 11/26 709/224 |
| 2008/0004828 A1 | 1/2008 | Mizrachi |
| 2008/0027581 A1 | 1/2008 | Saether et al. |
| 2008/0033596 A1 | 2/2008 | Fausak et al. |
| 2008/0071627 A1 | 3/2008 | Janger |
| 2008/0097770 A1 | 4/2008 | Low et al. |
| 2008/0109746 A1* | 5/2008 | Mayer .............. G06Q 20/3558 715/772 |
| 2008/0111989 A1 | 5/2008 | Dufour et al. |
| 2008/0133432 A1 | 6/2008 | Ramseyer |
| 2008/0149720 A1 | 6/2008 | Colville |
| 2008/0177598 A1 | 7/2008 | Davie |
| 2008/0207198 A1 | 8/2008 | Jude |
| 2008/0231113 A1 | 9/2008 | Guccione et al. |
| 2008/0255901 A1 | 10/2008 | Carroll et al. |
| 2008/0256008 A1 | 10/2008 | Kwok |
| 2008/0281691 A1 | 11/2008 | Pearson et al. |
| 2008/0296374 A1 | 12/2008 | Gonen et al. |
| 2008/0303915 A1 | 12/2008 | Omi |
| 2008/0306701 A1 | 12/2008 | Zhong et al. |
| 2009/0051907 A1 | 2/2009 | Li et al. |
| 2009/0078775 A1 | 3/2009 | Giebel et al. |
| 2009/0079388 A1 | 3/2009 | Reddy |
| 2009/0095047 A1 | 4/2009 | Patel et al. |
| 2009/0114716 A1 | 5/2009 | Ramachandran |
| 2009/0132813 A1 | 5/2009 | Schibuk |
| 2009/0160668 A1 | 6/2009 | Crowley et al. |
| 2009/0177319 A1 | 7/2009 | Garibaldi et al. |
| 2009/0184865 A1 | 7/2009 | Valo et al. |
| 2009/0187491 A1 | 7/2009 | Bull et al. |
| 2009/0190142 A1 | 7/2009 | Taylor et al. |
| 2009/0207743 A1 | 8/2009 | Huq et al. |
| 2009/0244285 A1 | 10/2009 | Chathukutty |
| 2009/0247133 A1 | 10/2009 | Holmen et al. |
| 2009/0248883 A1 | 10/2009 | Suryanarayana et al. |
| 2009/0251815 A1 | 10/2009 | Wang et al. |
| 2009/0262341 A1 | 10/2009 | Konopa et al. |
| 2009/0265035 A1 | 10/2009 | Jenkinson et al. |
| 2009/0299543 A1 | 12/2009 | Cox et al. |
| 2009/0312009 A1 | 12/2009 | Fishel |
| 2009/0321511 A1 | 12/2009 | Browne |
| 2009/0322706 A1 | 12/2009 | Austin |
| 2010/0005004 A1 | 1/2010 | Hudak et al. |
| 2010/0051695 A1 | 3/2010 | Yepez et al. |
| 2010/0063894 A1 | 3/2010 | Lundy |
| 2010/0088192 A1 | 4/2010 | Bowles et al. |
| 2010/0110174 A1 | 5/2010 | Leconte |
| 2010/0115887 A1 | 5/2010 | Schroeder et al. |
| 2010/0147953 A1 | 6/2010 | Barkan |
| 2010/0157280 A1 | 6/2010 | Kusevic et al. |
| 2010/0161397 A1 | 6/2010 | Gauthier et al. |
| 2010/0162359 A1 | 6/2010 | Casey et al. |
| 2010/0169231 A1 | 7/2010 | Bowles et al. |
| 2010/0185506 A1 | 7/2010 | Wolff |
| 2010/0219234 A1 | 9/2010 | Forbes |
| 2010/0228676 A1 | 9/2010 | Librizzi et al. |
| 2010/0235198 A1 | 9/2010 | Fini et al. |
| 2010/0237854 A1 | 9/2010 | Kumhyr et al. |
| 2010/0262481 A1 | 10/2010 | Baker et al. |
| 2011/0035322 A1 | 2/2011 | Lively |
| 2011/0043628 A1 | 2/2011 | Yun |
| 2011/0060641 A1 | 3/2011 | Grossman et al. |
| 2011/0066514 A1 | 3/2011 | Maraz |
| 2011/0067520 A1 | 3/2011 | Ihrke et al. |
| 2011/0113479 A1 | 5/2011 | Ganem |
| 2011/0235853 A1 | 9/2011 | Bowles et al. |
| 2011/0313840 A1 | 12/2011 | Mason et al. |
| 2012/0016518 A1 | 1/2012 | Saario et al. |
| 2012/0026582 A1 | 2/2012 | Okabe et al. |
| 2012/0029985 A1 | 2/2012 | Wilson et al. |
| 2012/0030097 A1 | 2/2012 | Hagan et al. |
| 2012/0054113 A1 | 3/2012 | Jayaraman et al. |
| 2012/0063501 A1 | 3/2012 | Aguren |
| 2012/0078413 A1 | 3/2012 | Baker, Jr. |
| 2012/0116928 A1 | 5/2012 | Gventer |
| 2012/0116929 A1 | 5/2012 | Gventer |
| 2012/0117001 A1 | 5/2012 | Gventer et al. |
| 2012/0127307 A1 | 5/2012 | Hassenzahl |
| 2012/0146956 A1 | 6/2012 | Jenkinson |
| 2012/0191562 A1 | 7/2012 | Bowles et al. |
| 2012/0235812 A1 | 9/2012 | De Mello et al. |
| 2012/0249779 A1 | 10/2012 | Ji et al. |
| 2012/0254046 A1 | 10/2012 | Librizzi et al. |
| 2012/0280934 A1 | 11/2012 | Ha et al. |
| 2012/0301009 A1 | 11/2012 | Dabic |
| 2012/0303431 A1 | 11/2012 | Phillips et al. |
| 2013/0006713 A1 | 1/2013 | Haake |
| 2013/0034305 A1 | 2/2013 | Jahanshahi et al. |
| 2013/0046611 A1 | 2/2013 | Bowles et al. |
| 2013/0046699 A1 | 2/2013 | Bowles et al. |
| 2013/0124426 A1 | 5/2013 | Bowles et al. |
| 2013/0126741 A1 | 5/2013 | Srivastava et al. |
| 2013/0137376 A1 | 5/2013 | Fitzgerald et al. |
| 2013/0144797 A1 | 6/2013 | Bowles et al. |
| 2013/0155061 A1 | 6/2013 | Jahanshahi et al. |
| 2013/0157641 A1 | 6/2013 | Brahami et al. |
| 2013/0159119 A1 | 6/2013 | Henderson et al. |
| 2013/0173434 A1 | 7/2013 | Hartman |
| 2013/0181935 A1 | 7/2013 | McKenzie et al. |
| 2013/0191236 A1 | 7/2013 | Bowles |
| 2013/0198089 A1 | 8/2013 | Bowles |
| 2013/0198144 A1 | 8/2013 | Bowles |
| 2013/0226679 A1 | 8/2013 | Bowles |
| 2013/0246211 A1 | 9/2013 | Sullivan |
| 2013/0246212 A1 | 9/2013 | Sullivan |
| 2013/0253700 A1 | 9/2013 | Carson et al. |
| 2013/0275314 A1 | 10/2013 | Bowles |
| 2013/0284805 A1 | 10/2013 | Kraft et al. |
| 2013/0290146 A1 | 10/2013 | West et al. |
| 2013/0297388 A1 | 11/2013 | Kyle, Jr. et al. |
| 2014/0006451 A1 | 1/2014 | Mullis et al. |
| 2014/0012643 A1 | 1/2014 | Behrisch |
| 2014/0038556 A1 | 2/2014 | DeSousa |

(56) References Cited

U.S. PATENT DOCUMENTS

| | | |
|---|---|---|
| 2014/0046845 A1 | 2/2014 | Dogin et al. |
| 2014/0052329 A1 | 2/2014 | Amirpour |
| 2014/0067710 A1 | 3/2014 | Gventer et al. |
| 2014/0080550 A1 | 3/2014 | Ino et al. |
| 2014/0143161 A1 | 5/2014 | Ahn |
| 2014/0150100 A1 | 5/2014 | Gupta et al. |
| 2014/0156883 A1 | 6/2014 | Bowles |
| 2014/0214505 A1 | 7/2014 | Shuster-Arechiga et al. |
| 2014/0235258 A1 | 8/2014 | Wang et al. |
| 2014/0244315 A1 | 8/2014 | Cahill et al. |
| 2014/0278244 A1 | 9/2014 | Humphrey et al. |
| 2015/0066677 A1 | 3/2015 | Bowles et al. |
| 2015/0293860 A9 | 10/2015 | Bowles |
| 2016/0098689 A1 | 4/2016 | Bowles et al. |
| 2016/0275518 A1 | 9/2016 | Bowles et al. |
| 2016/0284019 A1 | 9/2016 | Bowles et al. |
| 2016/0328684 A1 | 11/2016 | Bowles et al. |
| 2016/0379287 A1 | 12/2016 | Dabiri |
| 2017/0301010 A1 | 10/2017 | Bowles et al. |
| 2018/0247280 A1 | 8/2018 | Bowles et al. |
| 2018/0260794 A1 | 9/2018 | Bowles et al. |
| 2019/0325530 A1 | 10/2019 | Bowles et al. |

FOREIGN PATENT DOCUMENTS

| | | |
|---|---|---|
| CN | 2708415 | 7/2005 |
| CN | 1864088 | 11/2006 |
| CN | 1957320 | 5/2007 |
| CN | 2912132 | 6/2007 |
| CN | 200965706 Y | 10/2007 |
| CN | 101176124 | 5/2008 |
| CN | 101379488 | 3/2009 |
| CN | 102246384 A | 11/2011 |
| CN | 202351953 U | 7/2012 |
| CN | 202394296 U | 8/2012 |
| CN | 102654927 A | 9/2012 |
| CN | 102682597 | 9/2012 |
| CN | 102812500 A | 12/2012 |
| CN | 102930642 A | 2/2013 |
| CN | 102976004 A | 3/2013 |
| CN | 103198562 A | 7/2013 |
| CN | 103226870 A | 7/2013 |
| CN | 203242065 U | 10/2013 |
| CN | 103440607 A | 12/2013 |
| CN | 103514641 | 1/2014 |
| CN | 103544772 A | 1/2014 |
| CN | 203408902 U | 1/2014 |
| CN | 103662541 A | 3/2014 |
| CN | 103679147 A | 3/2014 |
| CN | 203520502 U | 4/2014 |
| CN | 103824387 | 5/2014 |
| CN | 203588366 U | 5/2014 |
| CN | 103954626 | 7/2014 |
| DE | 10031532 | 10/2001 |
| EP | 0116970 | 12/1991 |
| EP | 1168253 A1 | 1/2002 |
| EP | 1703436 A2 | 9/2006 |
| GB | 2167553 | 5/1986 |
| JP | 07112801 A | 5/1995 |
| JP | H07334583 A | 12/1995 |
| JP | H11242005 A | 9/1999 |
| JP | 2000121564 A | 4/2000 |
| JP | 2000171409 A | 6/2000 |
| JP | 3123095 | 1/2001 |
| JP | 2002-019147 A | 1/2002 |
| JP | 2002183286 A | 6/2002 |
| JP | 2002259528 A | 9/2002 |
| JP | 2002302252 A | 10/2002 |
| JP | 2002324264 A | 11/2002 |
| JP | 2002358354 A | 12/2002 |
| JP | 2003139516 | 5/2003 |
| JP | 2003230229 | 8/2003 |
| JP | 2003242243 A | 8/2003 |
| JP | 2003-267509 A | 9/2003 |
| JP | 2003264007 A | 9/2003 |
| JP | 2004021569 A | 1/2004 |
| JP | 2004191496 | 7/2004 |
| JP | 2004-303102 A | 10/2004 |
| JP | 2004288143 A | 10/2004 |
| JP | 2004341681 A | 12/2004 |
| JP | 2005063203 | 3/2005 |
| JP | 2005122059 | 5/2005 |
| JP | 2005308476 | 11/2005 |
| JP | 2006127308 A | 5/2006 |
| JP | 2006195814 A | 7/2006 |
| JP | 2006203451 | 8/2006 |
| JP | 2006227764 A | 8/2006 |
| JP | 2006260246 A | 9/2006 |
| JP | 2007086725 A | 4/2007 |
| JP | 2007141266 A | 6/2007 |
| JP | 2007155455 | 6/2007 |
| JP | 2007179516 A | 7/2007 |
| JP | 2007265340 A | 10/2007 |
| JP | 2008045959 | 2/2008 |
| JP | 2008522299 A | 6/2008 |
| JP | 2008293391 A | 12/2008 |
| JP | 2009175035 | 8/2009 |
| JP | 2009245058 A | 10/2009 |
| JP | 2009250971 | 10/2009 |
| JP | 2009290852 | 12/2009 |
| JP | 2010177720 A | 8/2010 |
| JP | 2010276896 | 12/2010 |
| JP | 2011518387 | 6/2011 |
| JP | 2012504832 | 2/2012 |
| JP | 2012058932 A | 3/2012 |
| JP | 2013033361 A | 2/2013 |
| JP | 2013037441 A | 2/2013 |
| JP | 2013531823 A | 8/2013 |
| KR | 20000064168 A | 11/2000 |
| KR | 20010074614 | 8/2001 |
| KR | 20010097567 A | 11/2001 |
| KR | 100766860 B1 | 10/2007 |
| KR | 20130085255 A | 7/2013 |
| KR | 20140037543 A | 3/2014 |
| WO | WO-01/15096 A1 | 3/2001 |
| WO | WO-200115096 | 3/2001 |
| WO | WO-0205176 | 1/2002 |
| WO | 225613 | 3/2002 |
| WO | WO-0239357 A1 | 5/2002 |
| WO | WO-03012717 A1 | 2/2003 |
| WO | WO-03014994 A1 | 2/2003 |
| WO | WO-2004021114 A2 | 3/2004 |
| WO | WO-2004114490 A1 | 12/2004 |
| WO | WO-2005008566 A1 | 1/2005 |
| WO | WO-2005101346 A1 | 10/2005 |
| WO | WO-2006058601 A1 | 6/2006 |
| WO | WO-2006080851 A2 | 8/2006 |
| WO | 2007066166 | 6/2007 |
| WO | 2009128176 | 10/2009 |
| WO | WO-2009128173 A1 | 10/2009 |
| WO | WO-2009129526 A1 | 10/2009 |
| WO | WO-2010/040116 A1 | 4/2010 |
| WO | WO-2010128267 A1 | 11/2010 |
| WO | WO-2010128315 A1 | 11/2010 |
| WO | WO2011115857 A2 | 9/2011 |
| WO | WO-2011131016 A1 | 10/2011 |
| WO | WO-2012/138679 A1 | 10/2012 |
| WO | WO-2013074819 A1 | 5/2013 |
| WO | 2014075055 | 5/2014 |
| WO | 2015022409 | 2/2015 |

OTHER PUBLICATIONS

Aftermarket Cellular Accessories, "Cellular Phone Model Identification," retrieved from http://web/archive.org/web/20060328064957/http://aftermarketcellular.com/ic/identification.html on Mar. 16, 2014, published Mar. 28, 2006, 3 pages.

Altec Lansing User's Guide 2007, 8 pages.

Bussiness Wire, "The World's First Office Photography Machine" at CES 2008 Launched by Ortery Technologies, Jan. 7, 2008, 3 pages.

CNET, "Tackling LCD "burn ins", and dead/stick Pixels", published Sep. 2, 2009, retrieved from http://www.cnet.com/news/tackling-lcd-burn-ins-and-deadstuck-pixels/.

(56) References Cited

OTHER PUBLICATIONS

Co-Pending U.S. Appl. No. 14/498,763, filed Sep. 26, 2014.
Co-Pending U.S. Appl. No. 14/500,739, filed Sep. 29, 2014.
Co-Pending U.S. Appl. No. 14/506,449, filed Oct. 3, 2014.
Co-Pending U.S. Appl. No. 14/568,051, filed Dec. 11, 2014.
Co-Pending U.S. Appl. No. 15/630,460, filed Jun. 22, 2017.
Co-Pending U.S. Appl. No. 15/641,122, filed Jul. 3, 2017.
Co-Pending U.S. Appl. No. 15/641,145, filed Jul. 3, 2017.
Evgenii Masunov, Mar. 25, 2010, http://www.appleinsider.ru/news/ipone-obladaet-luchshim-tachskrinom-provereno_robotom.html, 4 pages.
Geekanoids, You Tube Video, "Apple iPhone 3GS Unboxing and Review", uploaded on Jun. 19, 2009, retrieved from http://www.youtube.com/watch?v=GCEi9QAeDqk on Sep. 2, 2009.
GSM Arena Glossary, "LCD (Liquid Crystal Display", retrieved from http://www.gsmarena.com/glossary.php3?term=lcd on Apr. 28, 2016, 1 page.
International Numbering Plan, www.numberingplans.com, 2 pages.
Lambert, Emily, "Use It Up, Wear It Out", Forbes 175.5 (2005): 77-78. Business Source Complete. Web. Jan. 6, 2015, 3 pages.
Littleton Partners with Donations Ink (Jan. 19, 2006) US Fed News Service, Including US State News. Web. Jan. 6, 2015, 1 page.
MobileGazette.com, "2006 in Review: The Good, The Bad and The Ugly", published Dec. 2006, retrieved from http://www.mobilegazette.com/2006-review-06x12x22.htm on Nov. 11, 2015.
Notice of Allowance dated Jul. 13, 2017 in U.S. Appl. No. 13/792,030, 9 pages.
Notice of Allowance dated Jul. 5, 2017 in U.S. Appl. No. 13/862,395, 9 pages.
Office Action dated Apr. 9, 2014 in U.S. Appl. No. 13/862,395, 26 pages.
Office Action dated Feb. 25, 2016 in U.S. Appl. No. 13/794,816, 76 pages.
Office Action dated Jul. 11, 2016 in U.S. Appl. No. 13/794,814, 21 pages.
Office Action dated Jul. 29, 2013 in U.S. Appl. No. 13/862,395, 19 pages.
Office Action dated Mar. 3, 2017 in U.S. Appl. No. 13/913,408, 29 pages.
Office Action dated Mar. 6, 2015 in U.S. Appl. No. 13/862,395, 29 pages.
Office Action dated May 31, 2016 in U.S. Appl. No. 13/658,828, 63 pages.
Office Action dated Sep. 18, 2015 in U.S. Appl. No. 13/862,395, 29 pages.
PC World, "Wipe Your Cell Phone's Memory Before Giving it Away", published Jan. 2006, retrieved from http://www.washingtonpost.com/wp-dyn/content/article/2006/01/30/AR2006013001144.html on Nov. 10, 2015.
PCT International Search Report for PCT Application No. PCT/2009/059461, filed Oct. 2, 2009.
PCT International Search Report for PCT Application No. PCT/2011/028251, filed Mar. 13, 2011.
PCT International Search Report and Written Opinion dated Jul. 18, 2014 for PCT Application No. PCT/US2014/024551, filed Mar. 12, 2014, 11 pages.
PCT International Search Report and Written Opinion dated Apr. 3, 2014 for PCT Application No. PCT/US2013/072697, filed Dec. 2, 2013, 7 pages.
PCT International Search Report for PCT Application No. PCT/US2012/032042, filed Apr. 4, 2012.
PCT International Search Report for PCT Application No. PCT/US2012/061587, filed Oct. 24, 2012.
PCT International Search Report for PCT Application No. PCT/US2013/023717, filed Jan. 30, 2013.
Perng et al., "A Novel Vision System for CRT Panel Auto-Inspection", Proceedings of the 2005 IEEE International Conference on Mechatronics, Jul. 10-12, 2005, pp. 4.
Perng et al., "A Novel Vision System for CRT PaNnel Auto-Inspection", Journal of the Chinese Institute of Industrial Engineers, vol. 24, No. 5, pp. 341-350 (2007).
Rawson, Chris, "TUAW: 25 Ways to Check the Hardware on Your iPhone 4", published Aug. 12, 2010, retrieved at http://www.tuaw.com/2010/08/13/hardware-test-your-iphone-4/ on Feb. 28, 2014.
Rehg et al. "Vision for a Smart Kiosk" IEEE, Computer Society Conference on Computer Vision and Pattern Recognition (1997).
RMS Communications Group, "RMS Communications Group Inc. opens cell phone kiosk at Ocean City Mall in Toms River, N.J.", retrieved from http://www.prweb.com/releases/2004/11/prweb177351.htm, Nov. 12, 2004, 2 pages.
Rolf Steinhilper "Remanufacturing: The Ultimate Form of Recycling", Fraunhofer IRBVerlag, 1998, parts 1-3, http://www.reman.org/Publications_main.htm.
SimplySellular, "Get Cash for your Old Cell Phone", published Apr. 2, 2010, retrieved from http://simplysellular.com/conditions.php on Jan. 6, 2015, 2 pages.
Wilson, Doug, "Liquid Crystal Display (LCD) Inspection System", National Instruments Case Study, available May 10, 2009, retrieved from http://sine.ni.com/cs/app/cod/p/id/cs-345 on Jan. 5, 2015, 2 pages.
Yahoo Answers, "What is a Clean ESN?" published Jun. 23, 2009, retrieved from http://web.archive.org/web/20090623215042/http://answers.yahoo.com/question/inde,8020US?qid=20080318061012AANFRco on Apr. 3, 2014.
Office Action dated Sep. 1, 2017 in U.S. Appl. No. 15/630,460, 23 pages.
Office Action dated Sep. 5, 2017 in U.S. Appl. No. 15/641,122, 7 pages.
Office Action dated Sep. 1, 2017 in U.S. Appl. No. 15/641,145, 20 pages.
Office Action dated Feb. 1, 2018 in U.S. Appl. No. 15/630,460, 24 pages.
Office Action dated Nov. 2, 2017 in U.S. Appl. No. 13/794,816, 75 pages.
Notice of Allowance dated Dec. 14, 2017 in U.S. Appl. No. 13/792,030, 5 pages.
Non-Final Office Action dated Apr. 8, 2019 in U.S. Appl. No. 15/214,791, 31 pages.
Non-Final Office Action dated Jul. 8, 2019 in U.S. Appl. No. 15/091,487, 31 pages.
Non-Final Office Action dated Oct. 25, 2019 in U.S. Appl. No. 16/195,785, 6 pages.
Final Office Action dated Jan. 29, 2020 in U.S. Appl. No. 15/091,487, 24 pages.
3GPP Organizational Partners, "3rd Generation Partnership Project; Technical Specification Group Terminals; AT command set for GSM Mobile Equipment (ME)," Global System for Mobile Communications, 1998, 124 pages.
Bournique, D.: "Mobile Karma Shuts Down As iCloud and Blacklists Challenge Used Phone Buyers", Prepaid Phone News, Jul. 23, 2014 (Jul. 23, 2014), XP055229747, Retrieved from the Internet <URL:http://www.prepaidphonenews.com/2014/07/mobile-karma-shuts-down-as-icloud-and.html>; accessed Nov. 27, 2017; 2 pages.
Cybercom Group Europe AB, "The OMSI 2.0 Interface Supports," OMSI 2.0 Description, available at least before Oct. 2008, 1 page.
Cybercom Group Europe AB, "OMSI Forum," Downloads, 2005, 2 pages.
Cybercom Group Europe AB, "OMSI Provides Easy Service and Maintenance for Mobile Phones," Press Release, 2005, 1 page.
Cybercom Group, "Leading Telecom Organisations Address Device Management Issues," Press Release, 2007, 1 page.
Investopedia: What's the difference between weighted average accounting and FIFO/LILO accounting methods? Aug. 19, 2010. Accessed via archive.org [https://web.archive.org/web/20100819200402/http://www.investopedia.com/ask/answers/09/weighted-average-fifo-lilo-accounting.asp].
Kanter, James Max, "Color Crack: Identifying Cracks in Glass," dated Dec. 9, 2014; retrieved from the internet http://www.jmaxkanter.com/static/papers/color_crack.pdf dated Sep. 22, 2017.

(56) References Cited

OTHER PUBLICATIONS

Oliveira, et al., "Automatic crack detection on road imagery using anisotropic diffusion and region linkage," 18th European Signal Processing Conference (EUSIPCO-2010), Aug. 23, 2010, pp. 274-278.
Phifer, "How to Use your 3G Phone as a Wireless Broad Band Modem," Computer Weekly News, 2007, 6 pages.
Shotton et al., "Efficiently Combining Contour and Texture Cues for Object Recognition", Procedings of the British Machine Vision Conference 2008, (Sep. 1, 2008), pp. 7.1-7.10 * abstract *.
Sony Ericsson Mobile Communications AB, "T68i/T68ie," White Paper, 2002, 71 pages.
Sony Ericsson Mobile Communications AB, "P800/P802," White Paper, 2003, 128 pages.
Tecace Software: "Your phone appraisal—Movaluate—Android Apps on Google Play", Android Apps on Google Play, Aug. 12, 2013 (Aug. 12, 2013), XP055230264, Retrieved from the Internet <URL:https://play.google.com/store/apps/details?id=com.tecace.android.app.movaluate&hl=en>; accessed Nov. 27, 2017; 2 pages.
Trading devices for dollars, The Economist (US) 405.8813:8 (US), Economist Intelligence Unit N.A. Incorporated, Dec. 1, 2012.
Turner, "5 MP3 Players for Pumping Up Your Workouts," Mashable.com, Nov. 4, 2010, available online at https://mashable.com/2010/11/04/mp3-players-for-sports/ (Year: 2010).
Zhang, Yiyang, "The design of glass crack detection system based on image preprocessing technology," 2014 IEEE 7th Joint International Information Technology and Artificial Intelligence Conference, IEEE, Dec. 20, 2014; pp. 39-42.
Non-Final Office Action dated Oct. 11, 2011 in U.S. Appl. No. 12/573,089, 17 pages.
Final Office Action dated Jan. 24, 2012 in U.S. Appl. No. 12/573,089, 17 pages.
Notice of Allowance dated Apr. 12, 2012 in U.S. Appl. No. 12/573,089, 10 pages.
Non-Final Office Action dated Jan. 8, 2013 in U.S. Appl. No. 13/487,299, 15 pages.
Notice of Allowance dated May 6, 2013 in U.S. Appl. No. 13/487,299, 9 pages.
Notice of Allowance dated Apr. 12, 2018 in U.S. Appl. No. 13/913,408, 21 pages.
Non-Final Office Action dated Jan. 7, 2021 in U.S. Appl. No. 15/977,729, 15 pages.
Non-Final Office Action dated Aug. 12, 2013 in U.S. Appl. No. 13/733,984, 31 pages.
Non-Final Office Action dated May 6, 2014 in U.S. Appl. No. 13/733,984, 33 pages.
Final Office Action dated Jan. 30, 2015 in U.S. Appl. No. 13/733,984, 35 pages.
Non-Final Office Action dated Jul. 15, 2013 in U.S. Appl. No. 13/705,252, 29 pages.
Non-Final Office Action dated Jan. 5, 2016 in U.S. Appl. No. 13/705,252, 37 pages.
Non-Final Office Action dated Apr. 13, 2015 in U.S. Appl. No. 13/693,032, 15 pages.
Non-Final Office Action dated Nov. 30, 2016 in U.S. Appl. No. 13/693,032, 14 pages.
Non-Final Office Action dated Aug. 28, 2015 in U.S. Appl. No. 13/792,030, 19 pages.
Non-Final Office Action dated Dec. 4, 2014 in U.S. Appl. No. 13/794,814, 22 pages.
Notice of Allowance dated Aug. 3, 2020 in U.S. Appl. No. 15/091,487, 20 pages.
Non-Final Office Action dated Aug. 2, 2010 in U.S. Appl. No. 12/727,624, 10 pages.
Final Office Action dated Oct. 1, 2010 in U.S. Appl. No. 12/727,624, 11 pages.
Notice of Allowance dated Dec. 20, 2010 in U.S. Appl. No. 12/727,624, 8 pages.
Non-Final Office Action dated Mar. 26, 2012 in U.S. Appl. No. 13/017,560, 10 pages.
Notice of Allowance dated Jul. 5, 2012 in U.S. Appl. No. 13/017,560, 7 pages.
Non-Final Office Action dated Dec. 10, 2012 in U.S. Appl. No. 13/562,292, 8 pages.
Notice of Allowance dated Jan. 24, 2013 in U.S. Appl. No. 13/562,292, 8 pages.
Notice of Allowance dated Jan. 11, 2018 in U.S. Appl. No. 13/862,395, 6 pages.
Non-Final Office Action dated Oct. 1, 2020 in U.S. Appl. No. 15/901,526, 24 pages.
Non-Final Office Action dated Mar. 27, 2012 in U.S. Appl. No. 12/785,465, 15 pages.
Notice of Allowance dated Apr. 11, 2012 in U.S. Appl. No. 12/785,465, 18 pages.
Non-Final Office Action dated Jan. 15, 2013 in U.S. Appl. No. 13/492,835, 17 pages.
Final Office Action dated May 31, 2013 in U.S. Appl. No. 13/492,835, 18 pages.
Non-Final Office Action dated Jan. 23, 2015 in U.S. Appl. No. 13/492,835, 22 pages.
Non-Final Office Action dated Sep. 10, 2015 in U.S. Appl. No. 13/492,835, 43 pages.
Final Office Action dated May 6, 2016 in U.S. Appl. No. 13/492,835, 32 pages.
Non-Final Office Action dated Sep. 1, 2017 in U.S. Appl. No. 15/630,460, 23 pages.
Final Office Action dated Feb. 1, 2018 in U.S. Appl. No. 15/630,460, 47 pages.
Examiner's Answer to Appeal Brief dated Sep. 28, 2018 in U.S. Appl. No. 15/630,460, 16 pages.
Supplemental Appeal Brief filed Apr. 9, 2020 in U.S. Appl. No. 15/630,460, 4 pages.
Notice of Allowance dated Jul. 6, 2020 in U.S. Appl. No. 15/630,460, 8 pages.
Non-Final Office Action dated Mar. 28, 2013 in U.S. Appl. No. 13/438,924, 20 pages.
Final Office Action dated Mar. 24, 2014 in U.S. Appl. No. 13/438,924, 32 pages.
Non-Final Office Action dated Sep. 24, 2015 in U.S. Appl. No. 13/438,924, 56 pages.
Final Office Action dated Jul. 11, 2017 in U.S. Appl. No. 13/438,924, 19 pages.
Notice of Allowance dated May 2, 2018 in U.S. Appl. No. 13/438,924, 11 pages.
Non-Final Office Action dated Sep. 5, 2017 in U.S. Appl. No. 15/641,122, 7 pages.
Notice of Allowance dated Sep. 27, 2017 in U.S. Appl. No. 15/641,122, 5 pages.
Notice of Allowance dated Oct. 12, 2017 in U.S. Appl. No. 15/641,122, 2 pages.
Non-Final Office Action dated May 10, 2018 in U.S. Appl. No. 15/811,501, 6 pages.
Notice of Allowance dated Aug. 16, 2018 in U.S. Appl. No. 15/811,501, 5 pages.
Non-Final Office Action dated Jun. 2, 2020 in U.S. Appl. No. 16/195,785, 8 pages.
Notice of Allowance dated Nov. 13, 2020 in U.S. Appl. No. 16/195,785, 6 pages.
Non-Final Office Action dated Jul. 7, 2015 in U.S. Appl. No. 13/753,539, 29 pages.
Final Office Action dated Feb. 12, 2016 in U.S. Appl. No. 13/753,539, 30 pages.
Non-Final Office Action dated Sep. 1, 2017 in U.S. Appl. No. 15/641,145, 20 pages.
Final Office Action dated Mar. 22, 2018 in U.S. Appl. No. 15/641,145, 20 pages.
Non-Final Office Action dated Apr. 11, 2013 in U.S. Appl. No. 13/658,825, 20 pages.
Final Office Action dated Apr. 3, 2014 in U.S. Appl. No. 13/658,825, 28 pages.

(56) References Cited

OTHER PUBLICATIONS

Non-Final Office Action dated Nov. 20, 2015 in U.S. Appl. No. 13/658,825, 51 pages.
Final Office Action dated Jun. 30, 2016 in U.S. Appl. No. 13/658,825, 23 pages.

* cited by examiner

FIGURE 5G

Trade-In Your Phone
Blackberry Curve
Question #1 of 5
[Main Menu] [Start Over] [Prev]

DOES THE PHONE POWER ON?

YES - BATTERY INCLUDED (Select)

YES - BATTERY NOT INCLUDED (Select)

NO (Select)

FIGURE 5H

Trade-In Your Phone
Blackberry Curve
Question #2 of 5
[Main Menu] [Start Over] [Prev]

DO THE LCD(S) WORK AND DISPLAY CORRECTLY?

YES - THE LCD(S) WORK (Select)

NO - THE LCD(S) DO NOT WORK (Select)

SECONDARY MARKET AND VENDING SYSTEM FOR DEVICES

CROSS REFERENCES TO RELATED APPLICATIONS

This patent application is a continuation application of U.S. patent application Ser. No. 13/913,408, filed on Jun. 8, 2013, which is a continuation application of U.S. patent application Ser. No. 13/487,299, filed on Jun. 4, 2012, now U.S. Pat. No. 8,463,646, issued on Jun. 11, 2013, which is a continuation application of U.S. patent application Ser. No. 12/573,089, filed on Oct. 2, 2009, now U.S. Pat. No. 8,195,511, issued on Jun. 5, 2012, which claims priority to U.S. Provisional Patent Application No. 61/102,304 filed on Oct. 2, 2008, and U.S. Provisional Patent Application No. 61/183,510 filed on Jun. 2, 2009, all of which are hereby incorporated by reference in their entireties.

STATEMENT REGARDING FEDERALLY SPONSORED RESEARCH OR DEVELOPMENT

Not Applicable

BACKGROUND OF THE INVENTION

Field of the Invention

The present invention generally relates to recycling electronic devices securely at an electronic kiosk.

Description of the Related Art

There has been a large increase in the number of recyclable devices used by the typical consumer. These devices include cell phones, PDA's, mp3 players, GPS devices, cameras, beepers, remote controls, cordless phones, calculators, etc. The rapid pace at which new technology and models of recyclable devices are introduced creates a situation where many consumers upgrade or replace one or more recyclable device on a frequent basis. Often, the consumer does not dispose of the prior recyclable device, but rather just stops using it and begins using the new device. This may happen over several generations of such devices.

In addition to recyclable devices, there are many other types of devices that have relatively high frequency replacement rates, including portable/mobile electronic devices, such as cell phones, MP3 players, etc, and non-portable electronic devices, such as computers, printers, and the like. In addition to electronic devices, there are content based digital media such as games on CD, DVD, or cartridge, or entertainment mass storage items such as CDs, DVDs, BluRay, etc. There is a need for handling of such items in a ecologically friendly manner, both via recycling or by proper disposal procedures. It has not been convenient for owners of recyclable devices to either recycle such devices or to properly dispose of such devices. There is currently little incentive for a device owner to "do the right thing" with a used device. When the owner just stops using a device and simply puts it in storage, the opportunity for recycling or re-use by another party is lost. If the owner just throws the device away in normal trash containers, the proper recycling or safe disposing of the device is thwarted.

One particular problem associated with this phenomenon can be illustrated by an example of cell phones. There are more than 3.6 billion mobile phone users in the world with an annual growth of 10% per annum. The replacement rate of mobile handsets is roughly every 18 months as new models with more features and new standards evolve. Wireless carriers also offer new phones below cost, or free, as incentives to get customers to sign lucrative two-year service contracts ensuring a constant build-up of old mobile phones. Old mobile phones and other mobile devices (pagers, PDAs) present a growing threat to the environment. As of 2007, there are more than 750 million mobile phones waiting to be recycled in the US; either in drawers, or already in the waste stream. Another 150 million or so will be added this year and even more next year. Once in the waste stream, these devices may leak Lead, Mercury, Cadmium, Arsenic and other toxic substances into the water supply. Municipalities often incinerate their waste, instantly putting these toxic elements into the air, and they return to earth in rain water. A problem that needs to be solved is to make it easy and accessible for the public to recycle or resell their mobile phones and other recyclable devices. Two reasons why mobile phones are not being recycled or resold are difficult access to recycling or reselling facilities, and secondly security concerns about the information stored on the mobile phone. Although this example relates to mobile phones, the same problems apply to all recyclable devices.

BRIEF SUMMARY OF THE INVENTION

The system enables one to securely recycle, donate, trade-in, and/or sell portable/mobile electronic devices, such as cell phones, MP3 players, etc, and non-portable electronic devices, such as computers, printers, and the like, as well electronic devices, there are content based digital media such as games on CD, DVD, or cartridge, or entertainment mass storage items such as CDs, DVDs, BluRay, etc. in a publicly accessible location. In an embodiment where mobile phones are recycled, the system described may be used by a mobile phone owner to submit his/her mobile phone for recycling via an electronic kiosk and receive compensation in some manner. The compensation might be dispersed via cash, voucher, credit or debit card, or other magnetic or electronic transaction methods.

In one embodiment, a method for conducting the collection of previously used recyclable devices, such as mobile phones, GPS receivers, cameras, printers, computers, televisions, stereos, etc from consumers for the purpose of recycling and refurbishing those devices is a kiosk in a publicly accessible location. The kiosk displays one or more transaction options. The method may further include interaction between the user and the kiosk display options which may include powering these devices, testing and optical scanning, erasing of the stored data in these devices, determination and acceptance by consumer of compensation for the device's value. The method may further include selection by consumers through interaction with the kiosk a variety of compensation methods including dispensing of cash, or redeemable voucher via coupon, or credit card debiting or crediting, electronic donation to user specified charity or charities, or other electronic payment methods.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIGS. 5A-5L illustrate display conditions in an embodiment of the system.

DETAILED DESCRIPTION OF THE INVENTION

The system provides a path for consumers and others to sell, recycle, or donate their recyclable electronic devices in a one-stop environment. The system contemplates a network of kiosks in public spaces that can perform a combination of recycling processing steps that receive, identify, visually inspect, electrically test, electrically erase, grade quality, containerize (bag), label, and inventory, recyclable electronic devices. The system can then determine some form of compensation to an owner of the device. This compensation may be in the form of a direct payment, a credit on an account, a donation to a charity, a discount coupon for future purchases, etc. The device owner can accept the offered compensation or reverse the transaction and retrieve the device.

In the following description, an example is given with respect to mobile phones. However, it should be understood that the system can be implemented with any number of other devices or items, including other recyclable devices, without departing from the spirit and scope of the system. The system applies to, among others, any pre-owned electronic device or other consumer electronic and electric devices.

Figure 1:
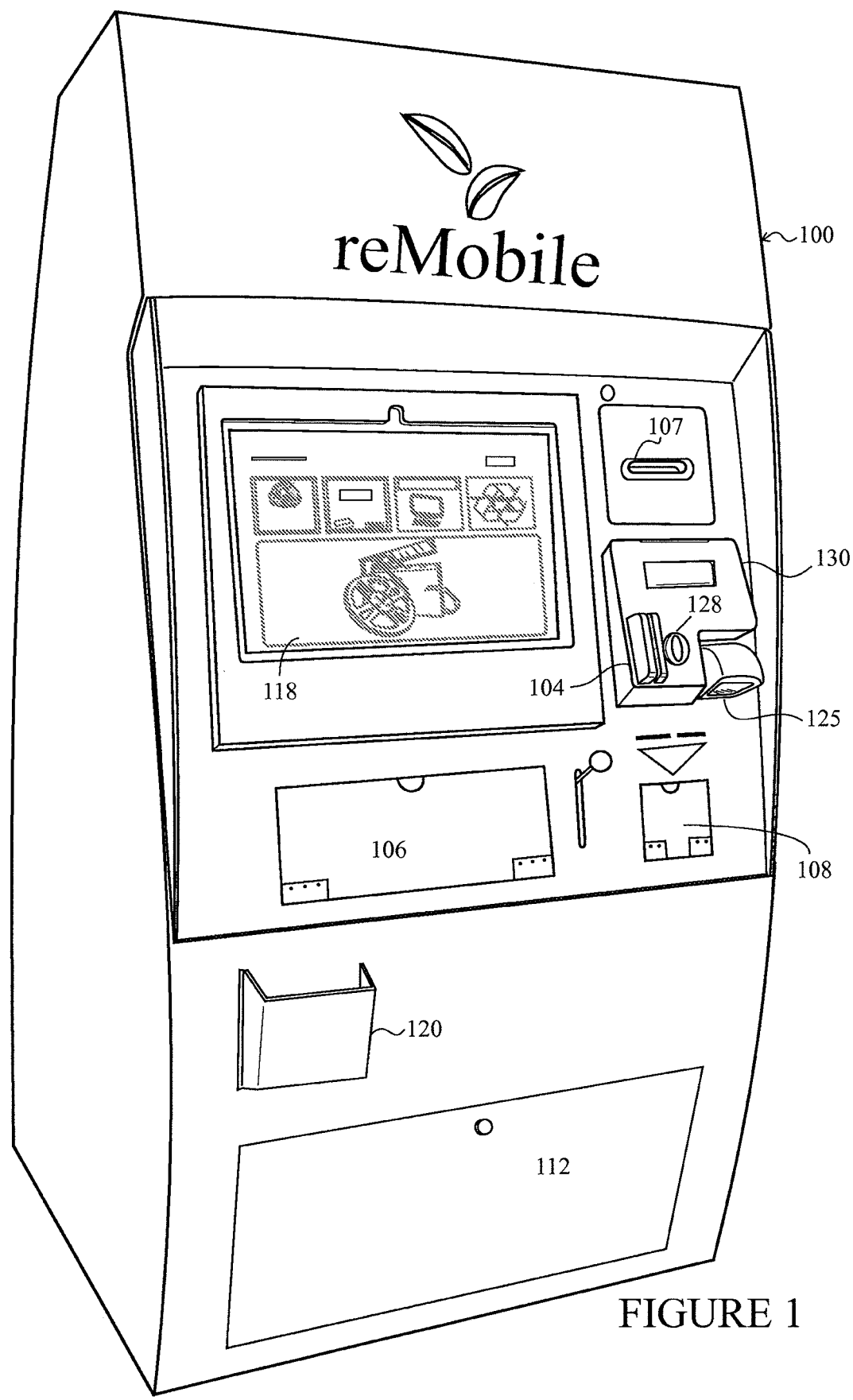
FIG. 1 is a perspective diagram of an embodiment of a recycling/vending machine of the system.

FIG. 1 illustrates a partially schematic front isometric view of a recycling kiosk 100 configured in accordance with an embodiment of the system. The kiosk 100 in this embodiment is of a typical size and shape of a vending machine, such as a soda machine, coin changing machine, can recycling machine, or other vending machines.

In one aspect of this embodiment, the recycling kiosk 100 includes a sealable mobile phone input region 106, bill and voucher acceptor/dispenser 107, card reader 109, mobile phone collector for mobile phones to be refurbished 112, mobile phone collection receptacle 108 (quick drop) for mobile phones to be recycled and computing and communications facility (not shown). The couplings from and to a remote computer may be a single coupling to a communications network such as the internet via wired LAN, wireless LAN, cellular or any other proprietary communications system. The Kiosk 100 may include a processing means or computer within the device. This may be a standard PC or other type embedded computer running any operating system such as Linux or MAC OS. The system may include a storage device that is a standard hard disk drive that will store the executable applications, test software, databases and other software required to operate the recycling kiosk.

The communications system can be either wired Ethernet to provide connection to the internet or it can use a wireless modem such as OSM, CDMA, 3G and 4G technologies for data communications. This communications system is well known by those knowledgeable of wireless data communications and is commercially available.

Figure 6:
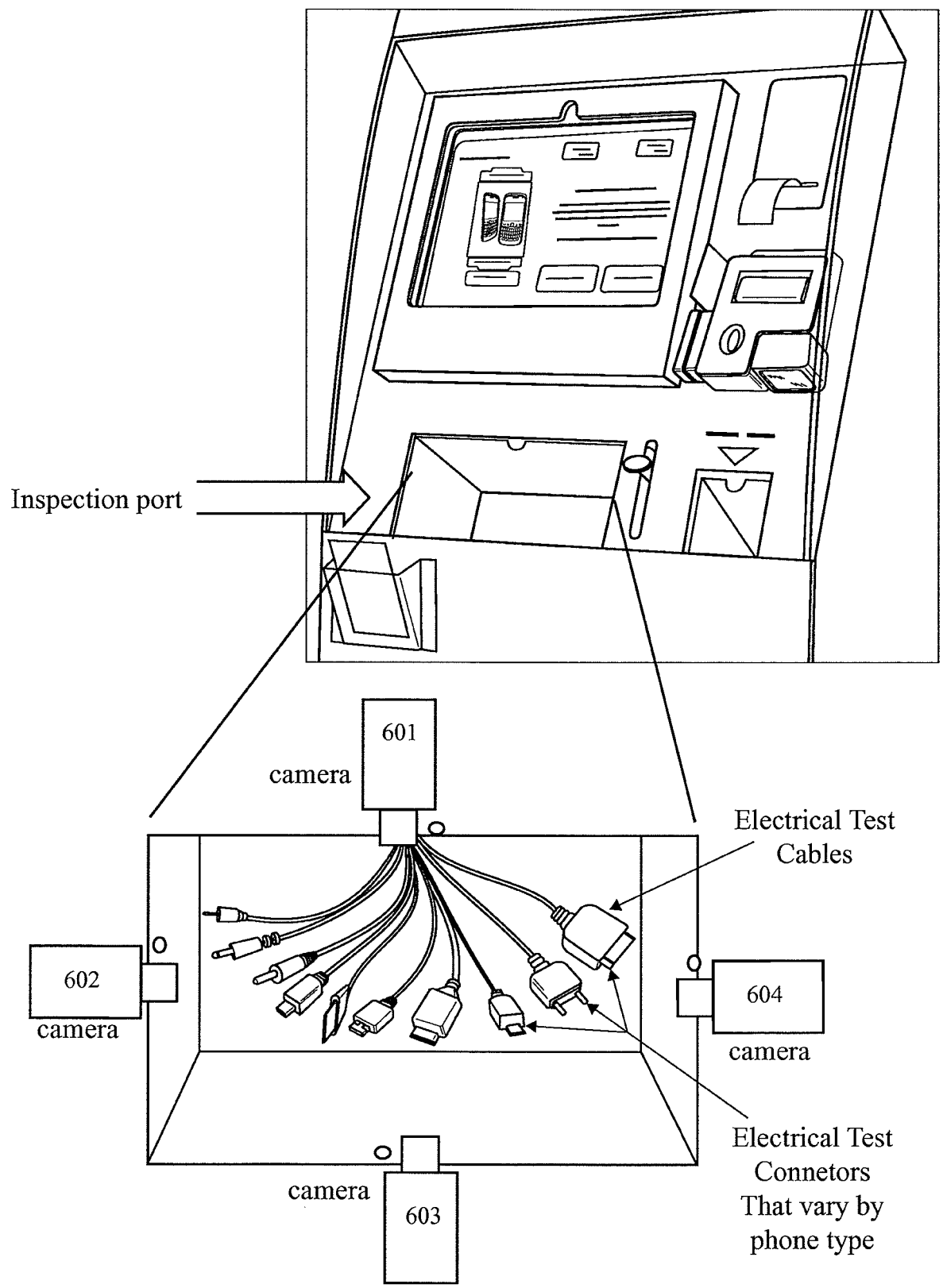
FIG. 6 illustrates an embodiment of the inspection port of the system.
Figure 7:
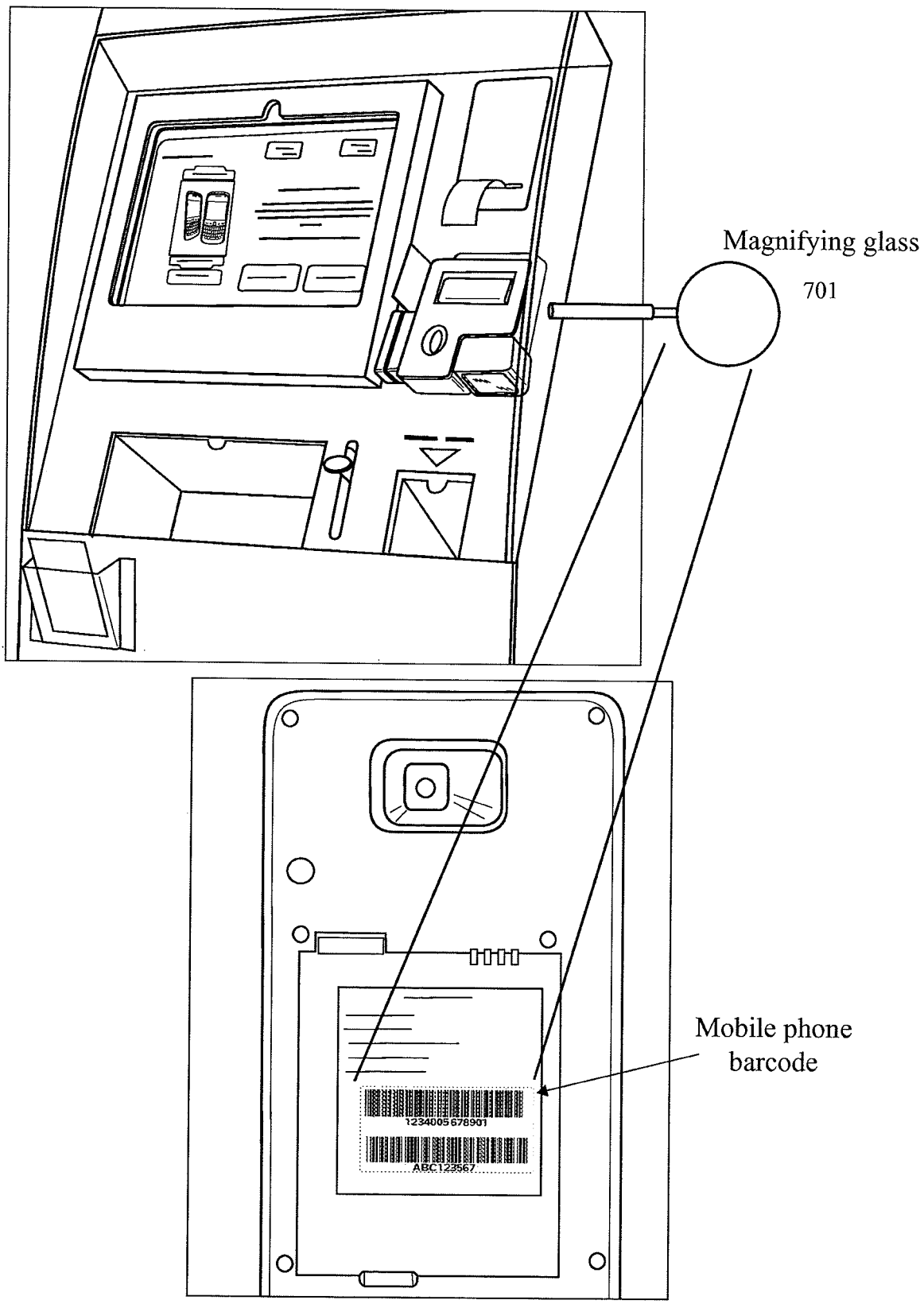
FIG. 7 illustrates another embodiment of the inspection port of the system.

The kiosk 100 also includes a bar code reader 125, bag/package dispenser 120, fingerprint reader 128, and digital signature pad 130. The input region 106 also acts as a phone inspection area. Referring now to FIGS. 6 and 7, the inspection area can include a one or more cameras 601-604, magnification tools 701 (i.e. magnifying glass), bar code scanners, weight scales, heat detectors, UV reader/detector, and the like.

The recycling kiosk 100 may further include a user interface device, such as a touch screen 118. The touch screen 108 may implement a keypad, user selection buttons 115A-115D, soft keys, etc. The touch screen 118 may be used to enable quick and easy access to various features and functions of the recycling kiosk 100. The display screen 118 may display information in color, monochrome, or "grayscale," and may be used to display elements of a user interface, advertisements, or other information. The recycling kiosk 100 may accept/dispense various forms of payment, including cash, credit cards, debit cards, chip cards, gift cards from the kiosk's host location or other gift cards, and other magnetic striped cards or electronic payment methods. In one embodiment of the recycling kiosk 100, a telephone handset may be included (not shown) to enable a customer to communicate with advertisers, providers of products advertised on the recycling kiosk, and to access assistance in using the recycling kiosk 100. In other embodiments, a microphone/speaker arrangement may be used. The recycling kiosk may also include a digital camera for use during mobile phone testing and other services. The Kiosk may also use the same or other camera to record the image of the user for purposes of complying with Second Hand Dealer Laws. The kiosk also includes a supply 120 of sealable plastic bags that have pre-printed barcode labels affixed thereto. The kiosk 100 also includes a bar code reader 125 to scan the bar code and associate it with a phone that is being transacted at the kiosk. The bar coder reader and/or UV detector can be used to scan an identifying bar code or other form of encoded information to identify the product model or product number. The system may use the barcode reader to read the barcoded identification on the inside of the battery pack. UV can be used for reading "invisible" barcodes in use by certain vendors such as Apple and others. The machine's bar code reader, camera, or UV detector is used to identify the product model ID, IMEI #, and/or FCC ID.

Further, the consumer may be asked to pre-bag, pre-box or place a barcode label on the CE device at some point before or during the inspection process. The consumer may be instructed to use wheels, slides or levers to drop the CE into a bag, box or directly into a bin. If dropped into a bag or box, the consumer may be instructed to use wheels, slides or levers to seal the outer package.

Each kiosk 100 will bin phones according to parameters including but not limited to; vendor/model, condition, value, visual quality, physical damage, water damage, locked or unlocked, carrier compatibility, frequency of phone, type of cellular standard supported (CDMA, GSM, etc.), or combinations of these parameters. The inventory of each kiosk bin may then be automatically transmitted from the kiosk to an online web posting whereby auctions, or live auctions can be held allowing buyers to bid and purchase specific bins from specific kiosks in real time. The bins then can be shipped directly from each specific kiosk to the bid winner during the next time the kiosk is serviced. Bins can associated with a single model or group of models. In other cases the bins may be associated with a particular type of phone (e.g. CDMA), or an other grouping that makes sense. Bins may also be associated with devices that are to be recycled for their material value, and should only ship when the bin is full. While other devices are binned to distinguish that they need to ship as quickly as possible because the device has immediate aftermarket resale demand and the real-time connection to the kiosk enables real-time inventory tracking and binning of recycled devices In one embodiment, the display of the system displays current purchase prices for different models of mobile phones. This can be used to encourage and provide incentive to customers to bring their used phones to the kiosk for resale or recycling. The kiosk can be in regular and periodic communication with the server to receive such data and update its display accordingly. The pricing data provided to the kiosk is called the Offer Price to the consumer, and is based upon aftermarket sales prices which vary on a regular basis (ie, daily) and for each make/model of recycled device. The offer price presented to the consumer is determined by subtracting the recycling fee from the pricing data provided by the aftermarket reseller.

The kiosk also monitors all of its consumables (paper, ink, etc.) and requests new supplies automatically so that the kiosk can be substantially constantly operational.

Figure 2:
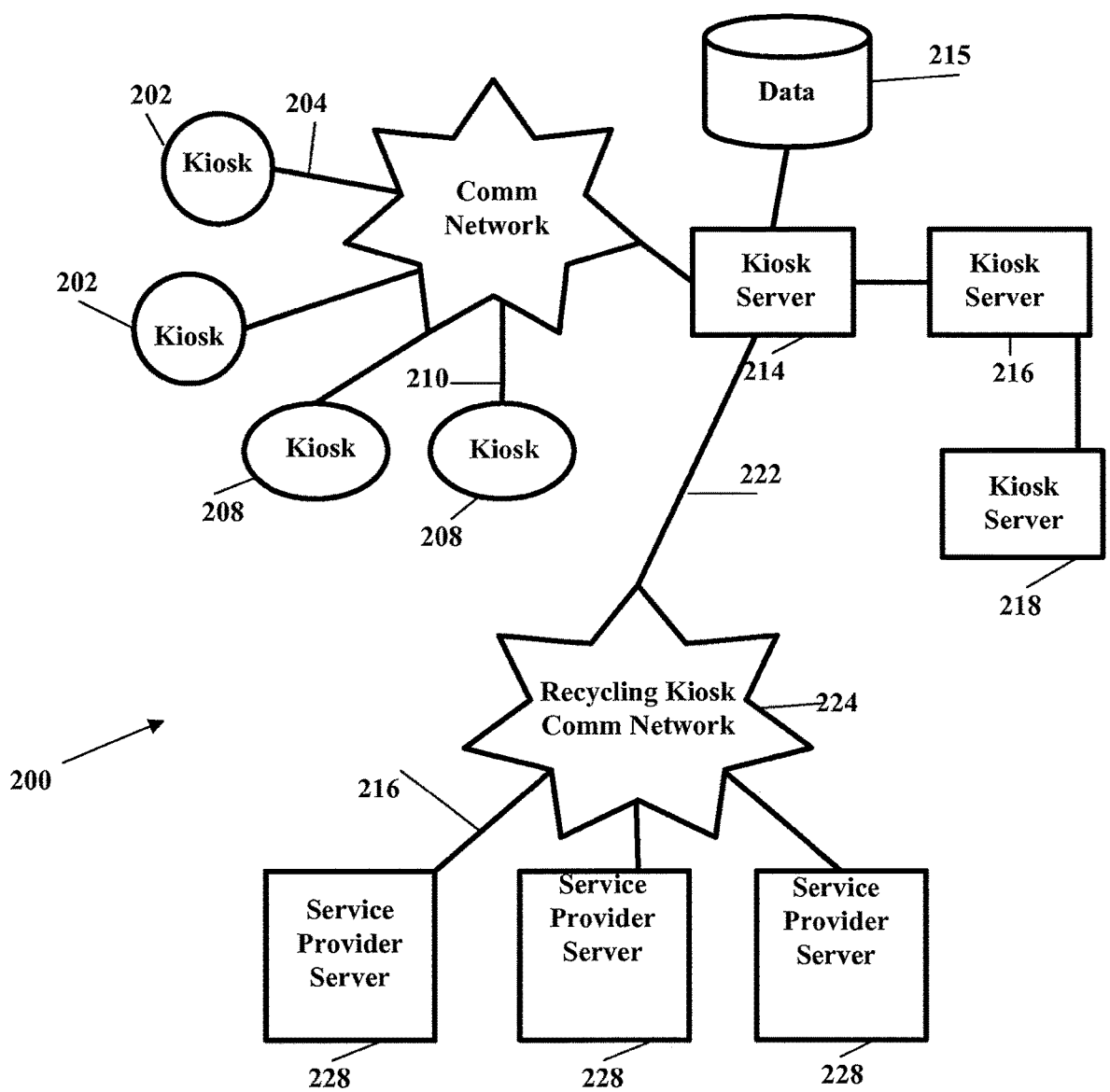
FIG. 2 is a diagram illustrating an embodiment of a network implementation of the system.

FIG. 2 illustrates a network topology 200 configured in accordance with an embodiment of the system. In one aspect of this embodiment, several recycling kiosks 202 may be coupled via communications links 204 or 210 to a communications network 206. While two forms of connecting recycling kiosks are shown in this FIG. 2, several embodiments are anticipated. Examples of embodiments of recycling kiosks include various forms of vending machines, Open Mobile Service Interface (OMSI, http://www.omsiforum.org/) based kiosks, and other retail automated machines. Also coupled to the communications network 206 via a communications link 212 may be a recycling kiosk server 214.

Transactions selected by customers at the recycling kiosks 202 or 208 may be routed to the recycling kiosk server 214. In another aspect of this embodiment, the recycling kiosk server 214 may be coupled to a database 215. The database 215 may be stored on the same or another recycling kiosk server 214, or may reside in a separate server (not shown). One familiar with the relevant art will understand how software executing on a recycling kiosk server 214 will be able to retrieve data stored in the database 215, whether that database 215 is stored on the same or separate servers. The database 215 may store information including unique identifiers that have been provided to customer vis the Touch Screen user interface or by way of wired or wireless communications to mobile device relating to vouchers, a personal identification number associated with each unique identifier, a telephone number, a credit amount, an indication of whether the voucher identified has already been used, and other pertinent information relating to providing recycling services on any recycling kiosk 202 or 208. In one aspect of this embodiment, the database transfers media content or executable applications to be delivered to the users' mobile device by way of wired or wireless communications.

In yet another aspect of this embodiment, the recycling kiosk server 214 may be coupled via a communications link to a biometrics server 216 and a content server 218. The biometrics server 216 conducts various fraud detection and prevention activities, including prevention of fraudulent credit cards. The content server 218 may perform various activities, including storing user interface content and advertising for use on the recycling kiosks 202 and 208. One familiar with the relevant art will understand how content stored on the content server 218 is transferred via various communications links and protocols to recycling kiosks 202 and 208 for rendering the content.

The content stored on a content server 218 may include images, Extensible Markup Language ("XML") documents, hypertext markup language ("HTML") documents, audio, video, text, etc., and instructions to enable a recycling kiosk 202 or 208 to render the content correctly. As an example, advertising and other content specifically targeted to consumer demographics on a kiosk or time-of-day basis may be rendered on recycling kiosks 202 and 208 after retrieval from the content server 218. A recycling kiosk 202 located in a department store may display different advertisements than a recycling kiosk 208 located at a convenience store. Additionally, a recycling kiosk 202 located in a department store may show different advertisements during weekdays than during evenings and weekends to target different demographics. Further, a recycling kiosk 202 located in a sporting goods department may show different advertisements than a recycling kiosk 202 located in an electronics department.

Recycling kiosks may be located in many public or otherwise accessible locations including shopping centers, street sidewalks, gas stations, DVD rental stores, grocery stores, and restaurants in addition to department and convenience stores. The recycling kiosk server 214 may also be coupled via a communications link 222 to a recycling kiosk communications network 224. Multiple service provider systems 228 may also be coupled to the recycling kiosk communications network 224 via communications links 226. Examples of service provider systems 228 include systems operated by eBay, cellular telephone companies, bankcard companies, and aggregators of services from service providers. These various service provider systems 228 may operate independently on different computer systems and may use different communications protocols. The recycling kiosk server 214 may be able to exchange information with multiple service provider systems 228 independently or jointly and in parallel or sequentially despite using the same or different communications protocols or system software.

Figure 3:
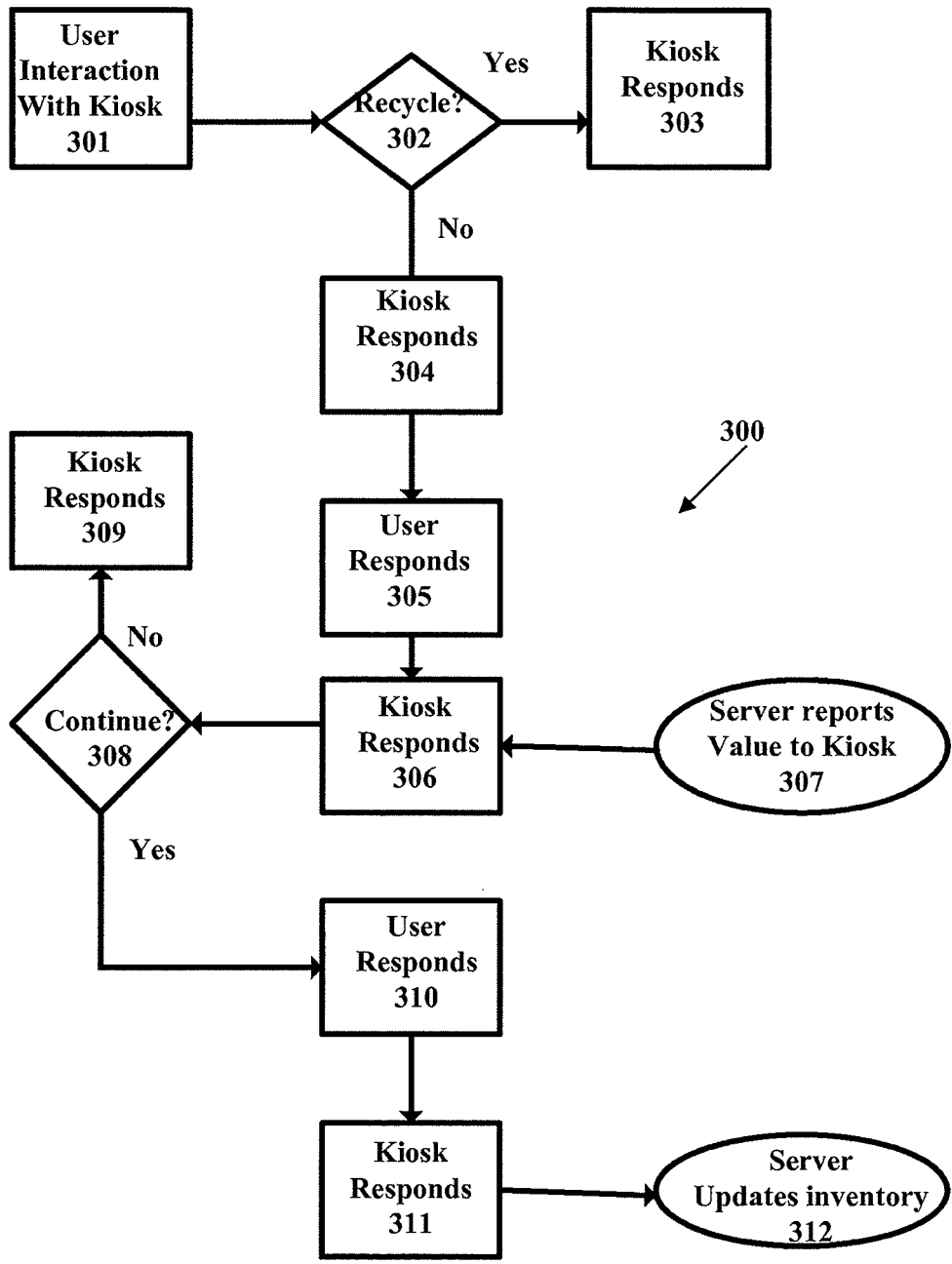
FIG. 3 is a flow diagram illustrating operation of an embodiment of the system.

A possible use scenario of the embodiment described in FIG. 1 and FIG. 2 is shown in FIG. 3. At step 301 a customer elects to sell or recycle a mobile phone. The customer checks to see if his mobile phone is supported for sale/refurbishing from a list on the screen of the kiosk. The customer activates the on-screen menu system and either enters the phone model directly or goes through a series of menus to determine if the phone is eligible for sale or only for recycling. After identifying the model phone, the customer may optionally at step 301 select a charity to which to donate proceeds and/or identify a fund raising group so that appropriate credit can be given to that group. In other embodiments, theses steps can be done at a later time. In one embodiment, the kiosk takes a picture of the customer and associates it with the phone and the transaction, to prevent fraud claims or to identify potential customers who are selling stolen phones.

At decision block 302 it is determined if the phone is only available for recycling. If yes, (i.e. it is not on the list of phones available for reselling) the customer can insert the mobile phone into receptacle 106 at step 303 and the phone falls into bin 112 for recycling. A tax voucher might be presented through 107 for the recycled phone.

If the phone is supported for refurbishment/resale the customer is then encouraged to engage the testing/rating operation of the system. At step 304, the system has determined the correct connector to couple to the phone. Connectivity options include and are not limited to cable, standard or proprietary connectors, hard docks, reading removable or external physical memory or other wireless methods like wifi, Bluetooth, RFID, NFC, and the like. In one embodiment, the system includes a plurality of connectors for known phone models. Based on the input from the user as to the identity of the phone model, the system can select the correct connector and offer it to the customer. In other embodiments, a plurality of connectors is available and identified (by name, color, etc) and the user is informed as to which one to use. In another embodiment, a universal connector is used to connect to the phone. After the phone is connected, the system presents a cage or cradle in which to place the phone. This is designed so that the phone is in a known or unknown initial position so that it can be visually inspected using photographic or other equipment.

At step 305 the phone is connected and inserted into 106. If this has been done correctly, the customer is given some indication (e.g. a green light) and the system proceeds to step 306. For instance, the software may direct the consumer to place the device in the "inspection bin" in a certain orientation. The consumer may then be asked to manually change the orientation Alternatively, the user may be asked to turn wheels or use slides or levers to change the orientation. The consumer may be asked to open a device such as a clam shell phone, open doors or view finders on video cameras, pop open features such as flashes, slide open covers, etc. and then place the item back in the inspection area. The user may also be asked to attach cables. The user may also be asked to attach restraints and/or use wheels, slides and/or levers to invoke restraint on the device.

At step 306 the phone is tested for operation using diagnostics and operating via, for example, the OMSI interface. The diagnostics may include electrical and physical testing including testing the phone's battery, screen, memory, button functionality and structural integrity.

In one embodiment, the phone is photographed and analysis software is used to identify scratches, cracks, wear patterns, dents, broken or missing pieces, inclusion of features such as lenses, buttons, connectors, badges, labeling and/or branding. Identification may be done by image comparison or other similar methods where the photograph taken of the phone is normalized and compared to a reference image. Other inspection methods may be used in conjunction with visual and/or electrical testing including weighing each device in the kiosk to determine specific weight and use that data to further refine verification of manufacturer and verification of exact device model. In another embodiment, the photographic image is used to identify the correct manufacturer and model number/product number. Visual ID could include any combination of the following: calculations based upon measurement, physical (e.g., mm, in, . . . ), pixel count or other. Identification based upon phone dimensions, location/size of buttons, LCD and other physical characteristics. One camera or multiple cameras may be used to determine height, width, depth as needed. Identification based on OCR (Optical Character Recognition) of identifiers such as Carrier (for phone), brand, model, serial number, other identifiers. Identification based upon barcodes. Consumer may be asked to orient CE on its front, back, side and then asked to change orientation as needed. Consumer may even be asked to remove CE cover(s), batteries and the like in order to gain access to identifiable items, such alphanumeric or barcode data. The system provides a way to use visual inspection with electrical inspection to identify a device, determine its value, and reduce possible fraud. The system can determine a preliminary identification of the phone with the visual system, and then present or light up the correct cable for that phone so the consumer can plug in the correct cable. The system can then confirm by electrical test that the visual identification was indeed correct, then test the phone to determine its functionality and value.

Identification is made by comparing collected information and comparing that to a database. The correct model identity is used by the kiosk system to determine the correct electrical connector from a database of device specification information for the purpose of performing electrical test, erase or re-programming of the device. For Consumer Electronic devices such as stereos, computers, DVD players, game consoles, etc. that can be evaluated electronically, in addition to or instead of visually identifying the device; it may be necessary to identify the cable connector type for electronic inspection. This can be done by visually identifying the dimensions and shape of a connector receptacle. This could also include identification of the pins or connector points in the receptacle. The kiosk system may automatically connect the electrical interface to the mobile device or instruct the user how to connect the electrical connector to the electronic device. In another embodiment, the image is electronically transferred to a human operator who can do a visual evaluation and grading of the cosmetic condition of the phone. In another embodiment, if the customer does not agree with the assigned grade or rating, the system includes a call button to provide two way communications with a human operator to discuss the rating.

In another embodiment, a "micro-kiosk" which would have the same facilities for visual/electrical inspection but would not necessarily bin and store the products it evaluates. The micro-kiosk would be used by an operator, perhaps with a group of discrete peripheral devices (computer, camera, a plurality of cable connectors, printer, barcode scanner, fingerprint reader, signature pad, etc.). This system would require an operator, store clerk, or technician, to complete transactions and guard against fraud. It may be a more appropriate solution than a full kiosk for some venues such as floor-space limited retailers, high-customer-clerk-engagement model retailers, and phone processors and/or refurbishers.

In one embodiment, the system communicates with the carrier associated with the phone to collect any information that could be germane to the device, including, for example, validation or authentication, registered ownership, account status, time in service, etc. In some cases, when the customer's identification information does not match the registered owner information, the system might automatically contact the assumed owner in some manner (automated telephone call, email, text message, etc.) to alert the owner of the phone of the possible transaction.

Another feature of an embodiment of the system is to determine if there is personal information on the phone. This can be determined by the presence of data in particular storage registers in the memory (e.g. quick-key stored numbers) or by looking at file types (jpegs, mp3s, etc.) or just assuming all non-default storage locations must contain personal data. The customer is offered the chance to erase the data from the phone. One option allows the customer to request that the data be first downloaded and then sent to a location designated by the customer (e.g. email address, web site, etc.). In another embodiment, there is a slot for the customer to enter a memory card (e.g. USB drive, memory stick, etc.) whereupon the system will upload the data to the memory device. In still another embodiment, the system offers a web location from which the user may retrieve the data at some later time if desired. In another embodiment, the user can, elect to have the data placed in another phone purchased by the customer at the kiosk or in the location of the kiosk or some other store. The customer can select a user name and password to access the system provided storage location.

Based on the results of the diagnostics, the system assigns the phone a rating. This rating can be a selection of one of a plurality of categories (e.g. excellent, fair, average, poor), a letter grade (A, B, C, D, F), or a ranking on a numerical scale. The system then accesses a database to determine a real-time value for the phone based on current resale values. The system may use real time or batch connectivity for updating pricing of used devices, connecting to an auction system or pre-auction system.

This data can be scraped from online sites such as eBay or Craigslist, it may be generated by the system and updated periodically, it may be based on a consumer guide, or any other suitable method for determining a current value for the phone. The value is determined by a current market price obtained via communication to the recycling server 214 using the communications network 206. The recycling server obtains a current market price for the phone from one of the service providers and stores, on a regular basis, market prices on the database. In the embodiment described in FIG. 1, a mechanism is available to update audiovisual or other user interface content or other aspects of the recycling kiosks 202 and 208. As an example, when content needs to be updated, the content only needs to be updated at the content server 218. The recycling kiosks 202 and 208 retrieve the updated content via the communications network 206 from the content server 218. As described above, the content used by a recycling kiosk 202 may be the same or different than content used by other recycling kiosks 208 or even another recycling kiosk 202. Once the value is determined, the value is provided at step 307 to the kiosk. The system then offers the customer a price or other remuneration for the phone that is typically less than the resale value. In other embodiments, the system can offer the customer a price or remuneration that is at the current real-time market price.

At step 308 it is determined if the user wishes to accept the offer. If not, the system proceeds to step 309 and opens the cage door and releases the phone back to the customer. If the user wishes to accept the offer, the system proceeds to step 310. At appoint where the user accepts a price, the system may then lock down the inspection area to prevent further access to the phone by the user. The system may then disconnect any cables that have been attached. At step 310, the user indicates acceptance of the decision by confirming on the keypad or touch-screen. In one embodiment, the system has a multi-stage process to determine user acceptance so that the customer can back out if a mistake was made. At this point the system can proceed with deleting the personal data from the phone. In addition, once the transaction is confirmed, the system can tag the phone with a transaction number that is associated with the diagnostic data and the transaction itself. This may be a printed adhesive label that is affixed physically to the phone and/or the loading of electronic data corresponding to the transaction number onto the phone itself for traceability purposes.

At step 311 the system completes any additional testing and diagnostics of the phone, disconnects the cable from the phone, and prints a receipt for the customer. Transfer of funds may be authorized via the kiosk by crediting a customer credit card or account, by dispensing cash, or by dispensing a voucher or coupon. In other embodiments, the system issues a receipt to the customer who then can take it to, for example, a. store associated with the location of the kiosk, for payment. If the user has elected to donate the value of the phone to charity, the customer then is issued a donation receipt and settlement is accomplished later with the charity.

At step 312 the system updates its inventory database and transmits the update via the communications network 206 to the kiosk server 214.

Each kiosk will bin phones according to parameters including but not limited to; vendor/model, condition, value of device, shipping priority, locked or unlocked, carrier compatibility, frequency of phone, type of cellular standard supported (CDMA, OSM, etc), or combinations of these parameters. The inventory of each kiosk bin will then be transmitted from the kiosk to and online web posting whereby live auctions can be held allowing buyers to bid and purchase specific bins from specific kiosks in real time. The bins then can be shipped directly from each specific kiosk to the bid winner during the next time the kiosk is serviced.

The generation of these online offers can be automated. Appropriate text for each model of phone can be prepared in advance. Descriptions of the phone can be also automated based on the perceived condition of the phone. Finally, the inspection photograph(s) can be included in the online offer by electronically communicating them to the kiosk server. The diagnostics and testing information can be provided as part of the offer, as well as information about whether the phone is locked or unlocked, includes a sim card, expanded memory, or other descriptive information and features.

In other embodiments, the phones are first collected from the kiosk and then put into a resale channel. In some cases, the phones may be refurbished, reconditioned, or upgraded prior to resale. In another embodiment, the system is able to automatically update the firmware in the device while it is attached to the connector. Any updates or improvements that can be made electronically can be accomplished automatically at the kiosk.

One use of the kiosks may be to encourage fund raising by charitable or community groups. For example, instead of collecting old cans and bottles for recycling, groups such as the scouts, little league, or other groups could collect recyclable devices such as phones and use the kiosks to raise money. In one embodiment, the group registers with the system and receives a group identification number. Each individual might also receive an individual number. This is to encourage friendly competition among the fundraisers. The system can assign credits to each fundraiser based on the number and value of donated devices that are provided. In addition, the registration process allows the automatic deposit of funds to the charity or fundraising group. Even when the fundraising group is not the entity providing the phone, any customer can still elect to donate any funds to a charity. The customer can be presented with a list of registered charities and fundraising groups and can select one or more to receive all or some of the customer's proceeds.

Many phones and recyclable devices include proprietary chargers. One embodiment of the system contemplates the ability for the user to plug in the charger and insert the connector into a receptacle so that the charger can be tested as well. The system then tags the charger with the same transaction number and includes its value in the price and resale.

The system not only rates the cosmetic condition of the phone, but can also rate the condition of the battery. Once connected, the system can determine the ability of the battery to hold a charge, can measure is voltage and current, and assign a rating to the battery as well.

Figure 4:
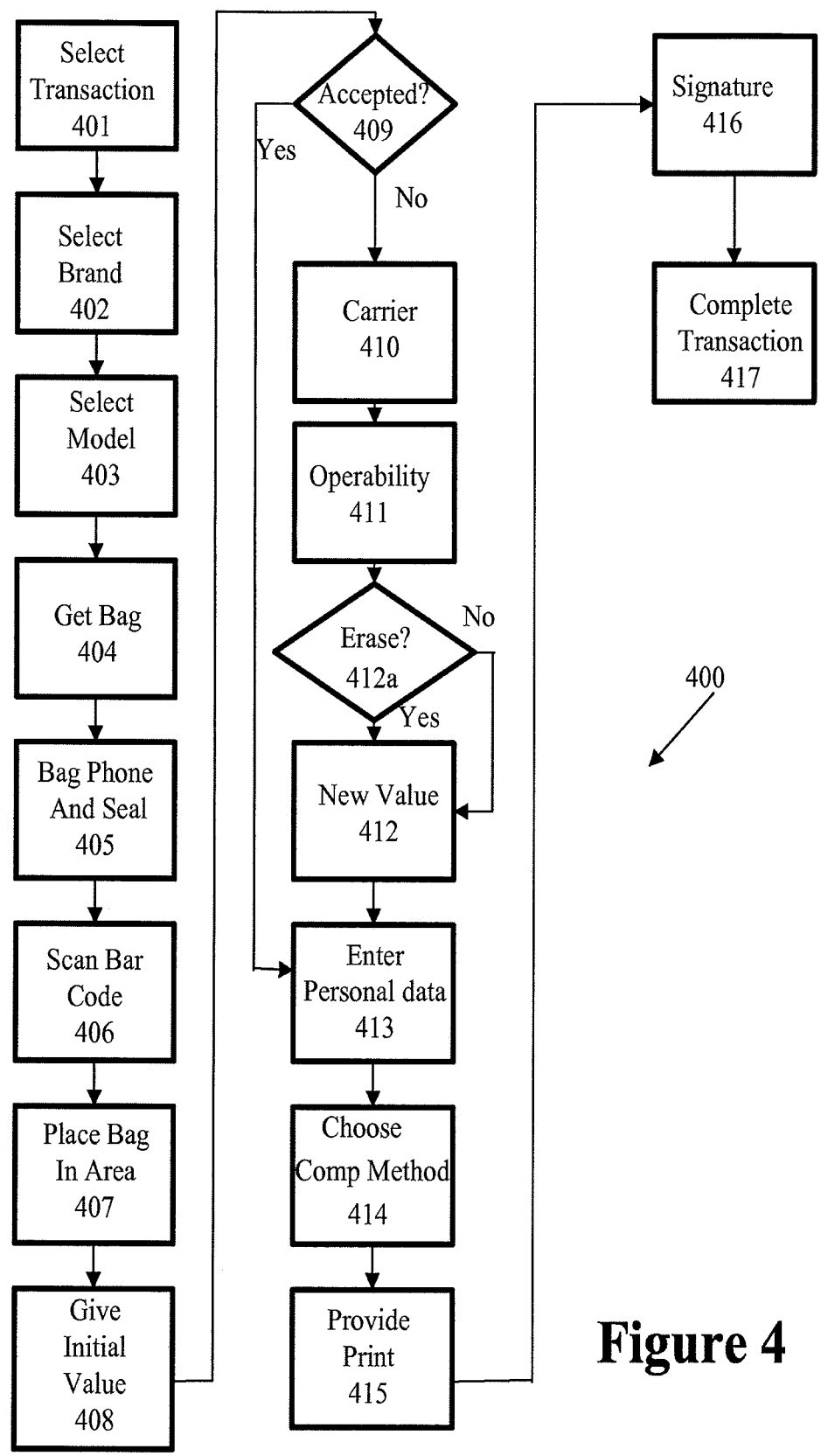
FIG. 4 is a flow diagram illustrating the operation of an embodiment of the system.
Figure 5A:
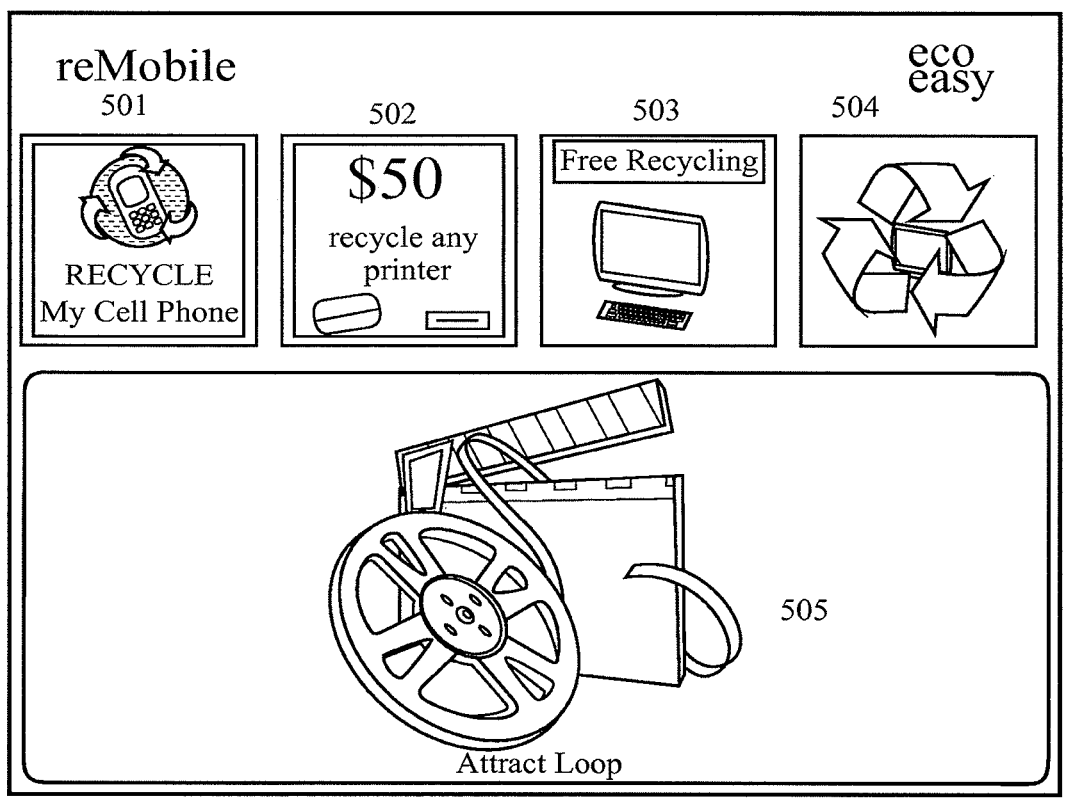

FIG. 4 is a flow diagram illustrating another embodiment of the operation of the system. The flow diagram of FIG. 4 is described in conjunction with embodiments of touch screen display images of FIGS. 5A-5L. At step 401 the operation begins. The display of the kiosk 100 may be as in FIG. 5A. An upper part of the screen may include a number of selectable options such as Recycle My Cell Phone 501, Printer Recycle Offer 502, Computer Recycle Offer 503 (This may be a branded or sponsored recycle offer, such as from a single company such as Dell) and Device Recycle Offer 504 (this button may be used for other devices and recyclable items that are not covered by the first three buttons). If desired, an attract loop (i.e. movie) may be provided in a lower region 505 of the display. The attract loop may also be used to teach the user how to use the system.

In one embodiment, the kiosk can broadcast wifi to push content to wifi enabled phones. The system can make users aware of its existence by alerting them via such wireless transmissions. In addition, the kiosk could play and/or broadcast content for the store location and/or third parties as an additional revenue source.

Figure 5B:
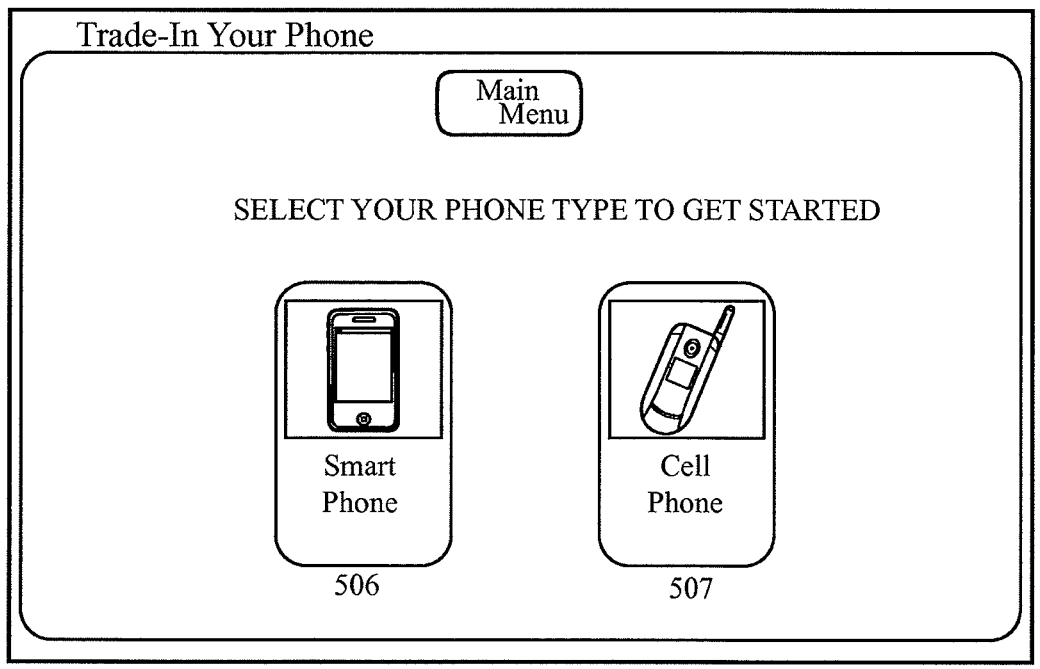

After the user selects the type of transaction at step 401, the system moves to the next screen. For purposes of example, we will presume that the user has elected to recycle a cell phone. The user selects the type of cell phone as shown in FIG. 5B by choosing smart phone 506 or cell phone 507.

Figure 5C:
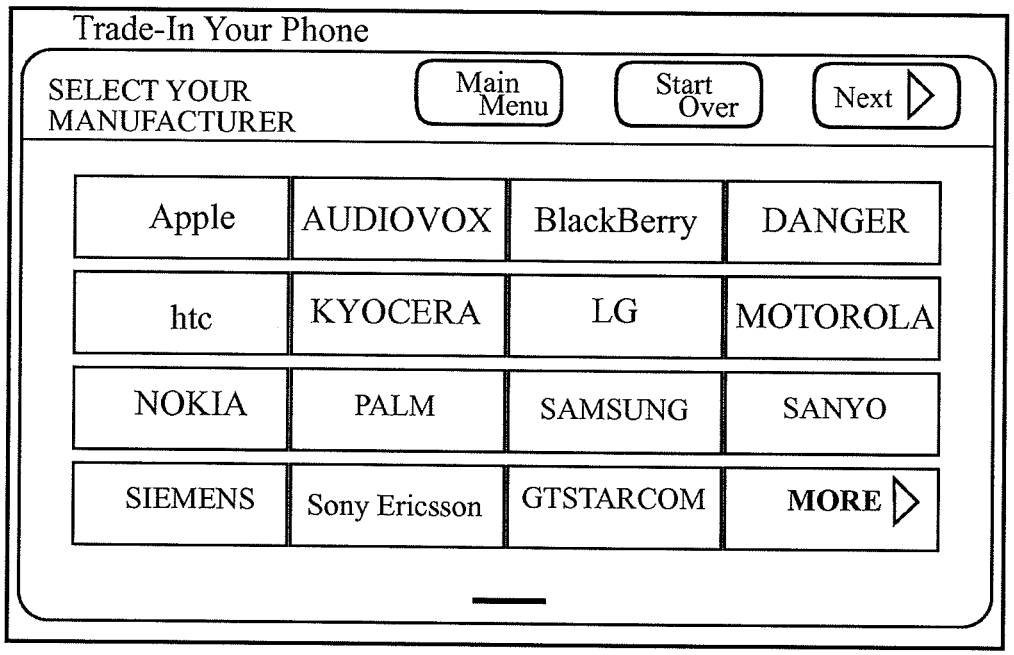
Figure 5D:
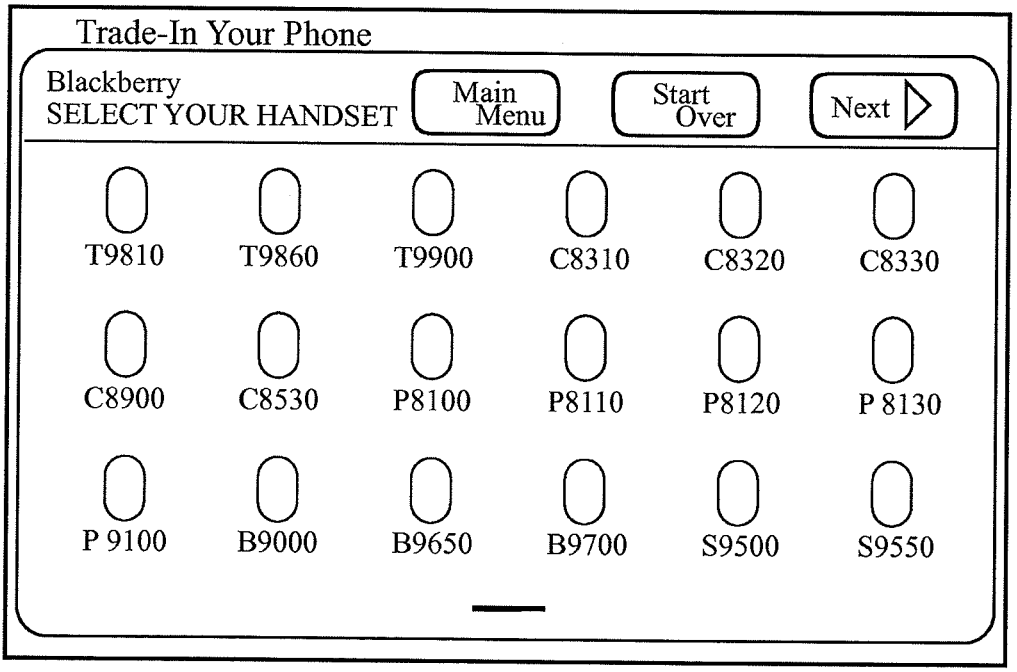
Figure 5E:
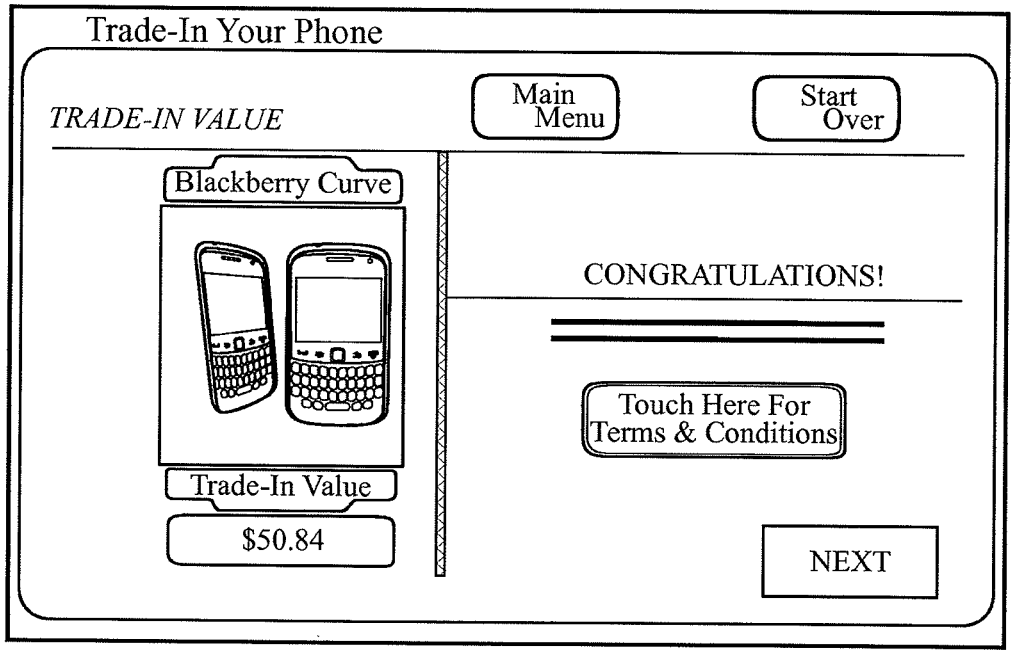
Figure 5F:
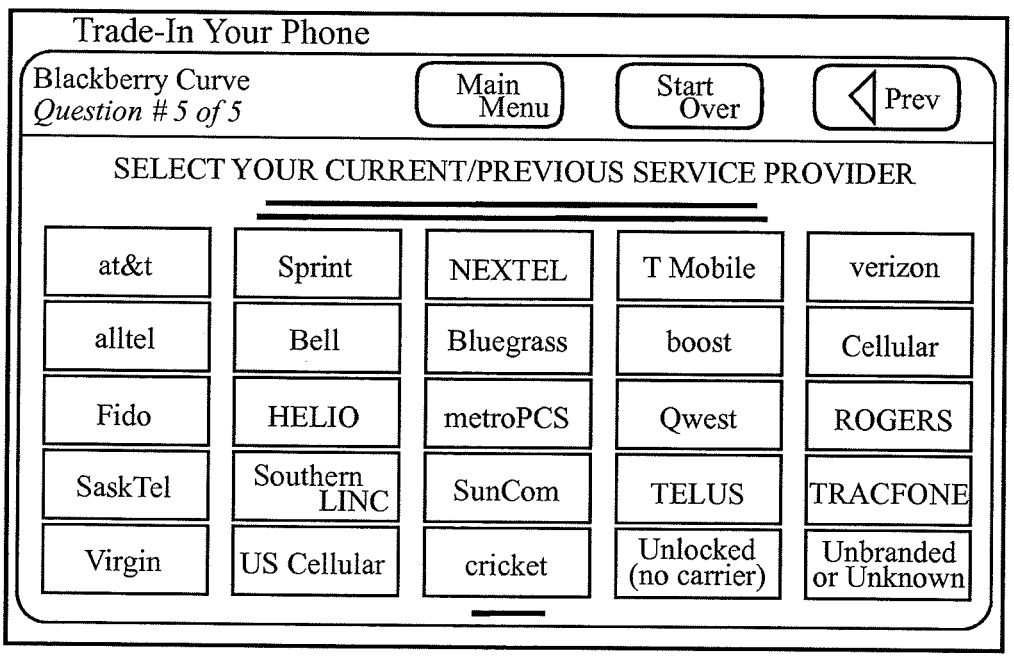

At step 402 the user chooses a brand of phone, such as by selecting a brand in FIG. 5C. If the users' brand is not shown on 5C, a "more" selection is available. In one embodiment, a keyboard is provided and the user can type in the brand, with an optional auto-complete feature provided. At step 403, the user is presented with a number of models for the particular manufacturer, as shown at FIG. 5D. The user selects the model at step 403.

At step 404, the user is instructed to get a bag from bag bin 120. At step 405 the user places the phone in the bag and seals it using a zip lock or some other suitable means. In one embodiment, each bag has pre-printed bar code label affixed thereto. In another embodiment, the kiosk 100 can print out a bar-coded self-adhesive label that the user can place on the bag. At step 406 the user scans the bar code using the bar code reader 125 of the kiosk 100.

At step 407 the kiosk may automatically bag the device or the user places the sealed bag into the inspection bin 106 of the kiosk 100. At step 408 the user is presented with a default value such as shown in screen 5E. This default value is for a typical phone of that type in unknown condition. The value may be determined by accessing a locally stored database or by accessing a dynamically updated database via network communication between the kiosk and a central location.

Figure 5I:
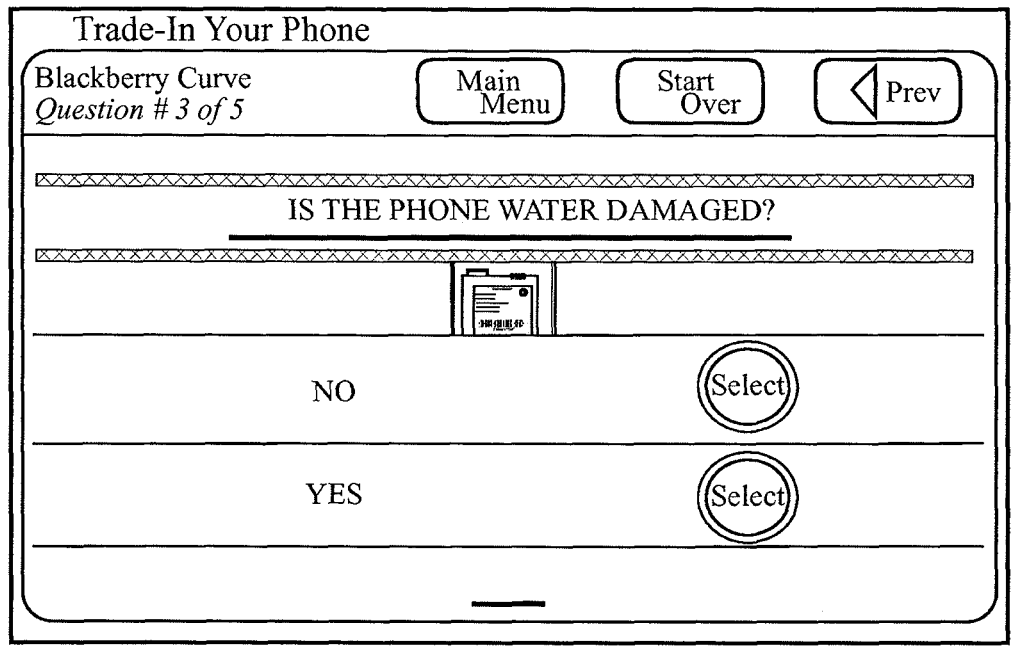

At decision block 409 it is determined if the user wants to accept the initial price. If so, the system proceeds to step 413. If not, the system proceeds to step 410 and a series of questions to determine a possible higher value for the phone. The user is first asked to identify the carrier at step 410 (see FIG. 5F). At step 411 the user is asked other questions about the phone such as whether it powers on (FIG. 5G), if the display works properly (FIG. 5H) and whether the phone is water damaged (FIG. 5I).

Figure 5J:
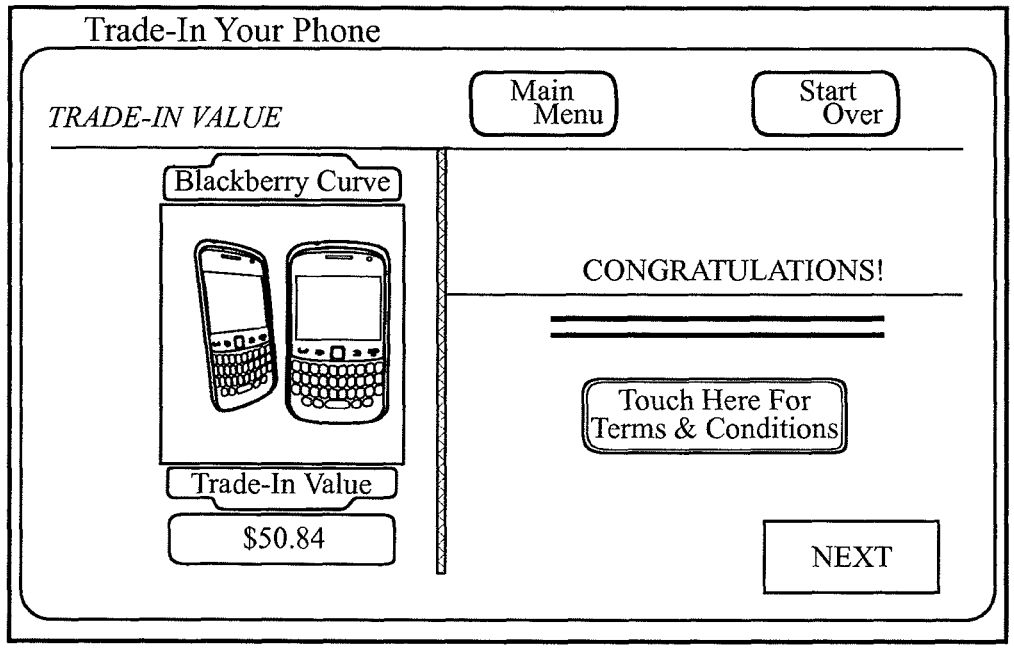

At step 412 and FIG. 5J, a new value is presented to the user. In some cases, the new value is higher, while in others it may be lower, all depending on the responses provided by the user. During this time, the system may do an automated inspection of the phone via a camera built into the inspection bin. In other instances, the user may be asked to plug the phone into a connector so that an automated electronic analysis of the phone can be accomplished.

Figure 5K:
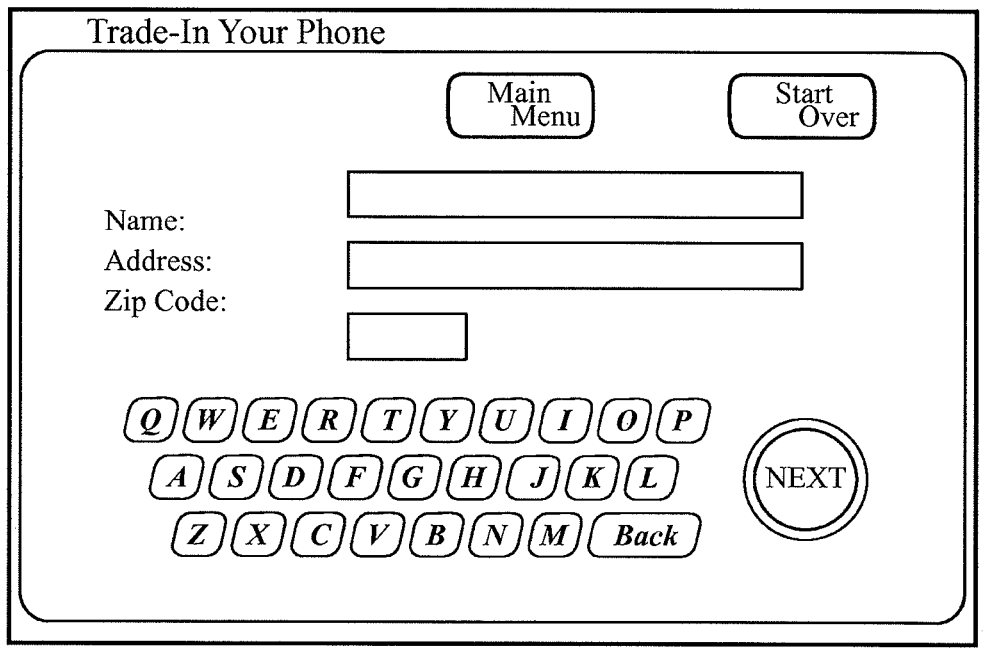
Figure 5L:
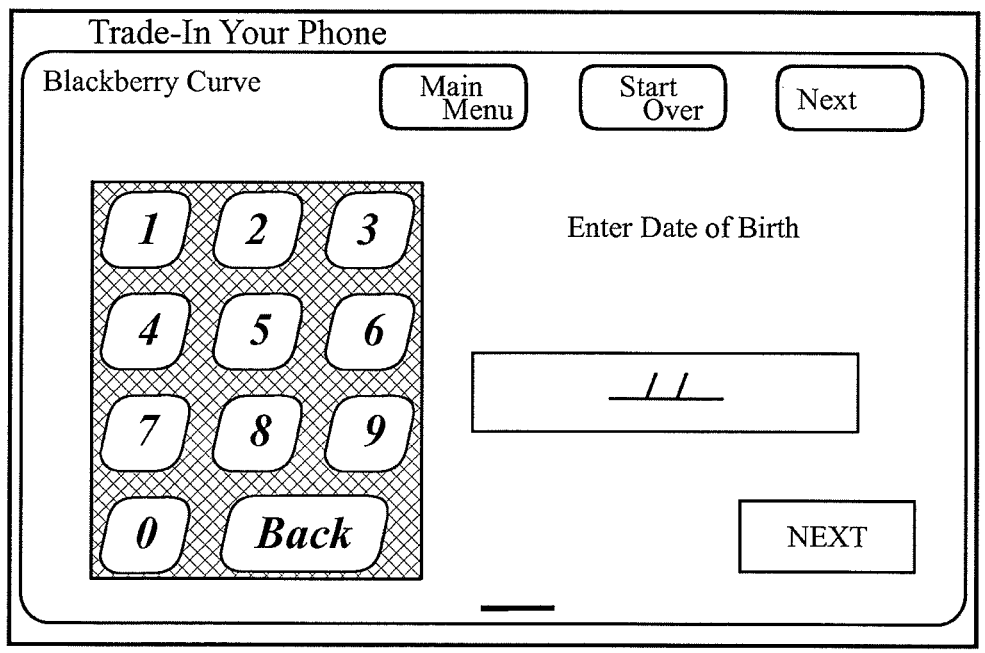

If the user accepts the new value at step 412 or at step 408, the system proceeds to collect personal information from the user at step 413. This may be accomplished by entering a customer loyalty number associated with a retailer where the kiosk is located, swiping a credit/debit card, by swiping a drivers license, or by manual entry using a keyboard presented on the touch screen of the kiosk, such as shown in FIGS. 5K and 5L.

At step 414 the user selects one of a plurality of compensation methods, such as store credit, charge card credit, discount coupon, etc. After the user selects a payment method, the user is prompted to enter a fingerprint by placing a thumb or finger on print reader 128 of kiosk 100. At step 416 the user signs an electronic signature pad 130 on kiosk 100 and the transaction completes at step 417.

Additional Embodiment

In an alternate embodiment, the system provides a network of inter-connected kiosks which communicate with centralized servers for the purpose of proving real-time pricing for a plurality of electronic devices that can be recycled using the system, including larger electronic devices such as personal computers, microwaves, or any other recyclable electronic device. The system implements functionality related to pricing, credit, and interaction, but provides a number of different implementations for receiving and transferring the recycled goods. The system may also include a web version that can be an initial entry into the system with physical transfer taking place in other methods.

As noted above, the system provides an interactive kiosk with touch screen display, printer, storage receptacle, envelopes/bags for storing devices. The User Interface (UI) instructs users how to determine the value of a recycled item or item being returned to a retail store for a trade-in value.

The machine will use a variety of inspection techniques to determine the value of the device digital media. The inspection techniques include the combination of visual inspection, and electrical testing using standard (USB, HDMI, DVI, etc.) electrical interfaces and proprietary (Apple, Nokia, etc.) electrical interfaces for identification & classification to uniquely identify the manufacturer and model number and software revision. Inspection of digital media such as games or entertainment mass storage devices may include unique interfaces and cabling necessary to digitally test a game cartridge or disc. DVD, BlueRay, or other disc drives may be used to read media discs. The software of the kiosk will verify the legitimacy, functionality and quality of the digital media stored on the mass storage disc or cartridge or tape cassette. In one embodiment, a user can recycle a game in advance of a new game release and receive credit towards the purchase of the new game and in some embodiments, get a preferred opportunity to get the game in advance of those who haven't recycled at the kiosk.

The system contemplates a number of ways for the user to interact with the system. Where possible, a comprehensive inspection and analysis is performed on the offered device and a price or credit is agreed upon. In another embodiment, a tentative price is agreed on pending an audit of the condition of the device. In one embodiment, the device may be deposited directly into the kiosk itself. In another embodiment, the system directs the seller to an associated store to hand over the device to appropriate personnel. In a different embodiment, the system provides mailing labels, envelopes, and the like so that the seller can ship the device to another location.

Small Devices: The kiosk provides a price for a small portable electronic device which is inserted in an envelope and placed into the kiosk for later payment once the device is audited.

Shipping Embodiment/Delayed Compensation

This is used where the user wants to recycle an electronic device and brings it to a local retailer. At the kiosk, the user selects the type of device to recycle (phone, camera, etc.) from a menu interface. The user answers questions about operating status, scratches, other defects, accessories y/n, etc.

As described above, the Kiosk displays the estimated value along with payment options including cash, % to a charity donation, retailer gift card, etc. The seller elects to proceed and accepts deal by entering personal information. At that point, the Kiosk prints a label; the user places electronic devices in shipping bag, and places the label on, the bag. Alternatively, the bag has a preprinted label already attached. The user then mails or ships the bag to the addressed location. At that point, the device may be audited to determine if the condition, features, and operability of the device matches the determination or input at the Kiosk. If so, the user is credited or paid the original amount. If the device is in worse condition, the user is notified and a lower price is paid.

User Inserts Bag into Kiosk

Large Devices:

In some cases, such as when the user has a much larger item like a PC, printer, or monitor that won't fit into the kiosk or is difficult to mail or ship, they interact with the kiosk to enter information, determine a value, and print paperwork to give to a clerk in an associated store along with item. In this case, the paper provides all the instructions for the store clerk to follow based upon a pre-defined set of rules between the retailer, OEM, and the system. The user is credited or paid, and the store handles further shipping or transfer of the item.

Content Media Trade-in/Trade-Up Claim

A network connected kiosk may be used by a consumer for the purpose of determining the functionality and trade-in value of content media such as a digital game, DVD, CD-ROM, BlueRay disk, etc. The items may be cartridges, disc, or other form of digital media used in conjunction with a content player such as a game system, PC, DVD Player and the like.

The machine must test the media to ensure that it is not a pirated or illegitimate copy of the game and that the game is in good digital/physical condition such that it is still usable and saleable on a secondary market. The information learned during the testing may include (but is not limited to), the maker, the game name and revision, and some qualification that the game is in fact operational.

The machine may use actual game consoles and/or other computers to test the games and digital media to verify their legitimacy and functionality.

Operation

The procedure which follows describes the user interaction with the machine for the purpose of 1) establishing value of the device, digital game, or other digital media using internet connectivity to a pricing engine server, and 2) for the purpose of remunerating the user for the agreed upon price provided by the kiosk and the network server. The price may be good for a period of time after the price is established by the kiosk (i.e., 2 weeks).

User approaches Media Take-back Kiosk and touches screen to start

What type of media is being inserted? User selects Console then media identification Display instructs user which connector to plug the media module/disc into (perhaps the machine only presents the correct cable or port based upon the media type).

User inserts media.

Kiosks confirms media name, maker, and digital quality (i.e., scratched DVD).

Kiosks displays trade-in price or may display a promotional offers to apply the proceeds towards the purchase of other media or accessories.

The kiosk will incorporate multiple connectors, slots, and plugs-in locations to accommodate the wide variety of media form factors (e.g. disks, cartridges, etc.).

The kiosk will incorporate a collection of individual content playing consoles (i.e., XBOX360, Wii, etc.) used to test the media to verify that it is functional.

The kiosk will incorporate these capabilities for the purpose of determining the value of a pre-owned consumer media by testing, and inspecting the media.

The kiosk is connected to the internet and a real-time pricing system will use the information collected at the kiosk to determine the market price or promotional trade-in value to present to the user. The user then must decide to proceed with the transaction or opt out.

Web Embodiment

A Web based pricing Kiosk replicates the experience of the kiosk but allows for a user to bring the device with them to the store, and drop it off after getting a price online. The system may print out a receipt, mailing label, etc. for the user to bring to a participating collection center.

The electronic recycling kiosk collects information that when compiled for the retailer, can be used to substantiate their compliance with States' eWaste and 2nd Hand Dealer Laws.

The recycling kiosk can be used to take personal information such as a photograph and fingerprint to identify people selling pre-owned goods, and as needed provide this information to local law enforcement authorities to determine if stolen goods have been moved through the recycling process, and by whom.

For devices with a USB interface, the Kiosk extracts PID/VID # using the USB interface to determine the make/model and present to the consumer a value based upon a real-time look-up of the current market value.

The system can use HDMI, DVI, 1394, i-Link interfaces and support for EDID (HDMI ID protocol) and same for DVI. Use these protocols to identify CE devices.

To prevent or reduce fraud, the system may incorporate a number of tests and analysis such as:

Weighing the device—this is prone to errors (case, no case, battery, no battery)

Visually inspecting the device to detect slight design features to detect fakes

IR, Visible light or laser scan a device to derive an heat absorption/decay signature for a given device. The theory is that the decay signature will be different for every make/model of device and will vary with the orientation of the scan on the same device. Fake or empty devices will not have the proper signature and will not be accepted for immediate payment. In this case, the user has the option to get paid after the phone is inspected by a human.

From the foregoing it is believed that those skilled in the pertinent art will recognize the meritorious advancement of this invention and will readily understand that while the present invention has been described in association with a preferred embodiment thereof; and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim:

1. A system for purchasing a used electronic device, the system comprising:
    a kiosk configured to receive the electronic device, wherein the kiosk includes an externally directed camera and an internal inspection area; and
    a controller including memory and one or more processors, wherein the memory carries instructions that, when executed by the one or more processors, cause the system to—
        receive the electronic device from a user at the kiosk,
        collect information from the electronic device via the kiosk,
        identify the electronic device based at least partially on the collected information,
        present, to the user via the kiosk, an offer to purchase the electronic device based at least partially on a result of identifying the electronic device,
        lock down the inspection area to prevent the user from accessing the electronic device,
        capture an image of the user via the externally directed camera, and
        associate the electronic device with the image of the user.

2. The system of claim 1 wherein the instructions, when executed by the one or more processors, cause the system to collect the information via a wireless connection between the kiosk and the electronic device.

3. The system of claim 1 wherein the instructions, when executed by the one or more processors, cause the system to collect the information via a wired connection between the kiosk and the electronic device.

4. The system of claim 1 wherein the instructions, when executed by the one or more processors, cause the system to identify the electronic device by comparing the collected information to information in a database.

5. The system of claim 1 wherein:
    the kiosk includes an internal storage receptacle; and
    the instructions, when executed by the one or more processors, cause the system to—
        receive an acceptance of the offer from the user, and
        move the electronic device into the storage receptacle after receiving the acceptance.

6. The system of claim 1 wherein:
    the collected information includes a unique identifier of the electronic device; and
    the instructions, when executed by the one or more processors, cause the system to identify the electronic device by identifying a device model corresponding to the identifier.

7. The system of claim 1 wherein the instructions, when executed by the one or more processors, cause the system to tag the electronic device with a transaction identifier.

8. The system of claim 7 wherein the instructions, when executed by the one or more processors, cause the system to tag the electronic device by loading the transaction identifier onto the electronic device.

9. The system of claim 1 wherein:
    the kiosk includes a user interface; and
    the instructions, when executed by the one or more processors, cause the system to ask the user a question about the electronic device via the user interface.

10. The system of claim 9 wherein the question is a question about a condition of a display of the electronic device.

11. A method of purchasing a used electronic device, the method comprising:
    receiving the electronic device from a user at a kiosk;
    collecting, via the kiosk, information from the electronic device after receiving the electronic device;
    identifying the electronic device based at least partially on the collected information;
    presenting, to the user via the kiosk, an offer to purchase the electronic device;
    locking down an internal inspection area of the kiosk to prevent the user from accessing the electronic device;
    capturing an image of the user via an externally directed camera of the kiosk; and
    associating the electronic device with the image of the user.

12. The method of claim 11 wherein collecting the information includes wirelessly collecting the information.

13. The method of claim 11 wherein collecting the information includes collecting the information via a wired connection between the kiosk and the electronic device.

14. The method of claim 11 wherein identifying the electronic device includes comparing the collected information to information in a database.

15. The method of claim 11, further comprising:
    receiving an acceptance of the offer from the user; and
    moving the electronic device into a storage receptacle of the kiosk after receiving the acceptance.

16. The method of claim 11 wherein:
    collecting the information includes collecting a unique identifier of the electronic device; and
    identifying the electronic device includes identifying a device model corresponding to the identifier.

17. The method of claim 11, further comprising tagging the electronic device with a transaction identifier.

18. The method of claim 17 wherein tagging the electronic device includes loading the transaction identifier onto the electronic device.

19. The method of claim 11, further comprising prompting the user to answer a question about the electronic device via a user interface of the kiosk.

20. The method of claim 19 wherein the question is a question about a condition of a display of the electronic device.

* * * * *